US012452386B1

(12) United States Patent
Springer

(10) Patent No.: US 12,452,386 B1
(45) Date of Patent: Oct. 21, 2025

(54) SETTING VIRTUAL BACKGROUNDS FROM VIRTUAL BACKGROUND SOURCES

(71) Applicant: Zoom Communications, Inc., San Jose, CA (US)

(72) Inventor: Shane Paul Springer, Oregon City, OR (US)

(73) Assignee: Zoom Communications, Inc., San Jose, CA (US)

( * ) Notice: Subject to any disclaimer, the term of this patent is extended or adjusted under 35 U.S.C. 154(b) by 81 days.

(21) Appl. No.: 18/316,036

(22) Filed: May 11, 2023

Related U.S. Application Data

(63) Continuation of application No. 17/829,028, filed on May 31, 2022, now abandoned.

(51) Int. Cl.
  *H04N 7/14* (2006.01)
  *G06T 7/194* (2017.01)
(52) U.S. Cl.
  CPC ............ *H04N 7/141* (2013.01); *G06T 7/194* (2017.01)
(58) Field of Classification Search
  None
  See application file for complete search history.

(56) References Cited

U.S. PATENT DOCUMENTS

| | | | |
|---|---|---|---|
| 6,853,398 B2 | 2/2005 | Malzbender et al. | |
| 9,503,685 B2 * | 11/2016 | Baron, Jr. | G09G 5/14 |
| 11,025,837 B2 | 6/2021 | Punja et al. | |
| 11,475,615 B1 | 10/2022 | Springer et al. | |
| 2008/0030621 A1 * | 2/2008 | Ciudad | H04N 7/147 |
| | | | 348/E5.058 |
| 2012/0050323 A1 | 3/2012 | Baron, Jr. et al. | |
| 2017/0142371 A1 | 5/2017 | Barzuza et al. | |
| 2018/0255249 A1 * | 9/2018 | Funagi | H04N 5/272 |
| 2020/0314353 A1 * | 10/2020 | Punja | G06T 5/50 |
| 2023/0117301 A1 | 4/2023 | Olivieri et al. | |

OTHER PUBLICATIONS

How-To Geek, How to Change Windows 10's Wallpaper Based on Time of Day, https://www.howtogeek.com/355912/how-to-change-windows-10s-wallpaper-based on-time-of-day/, Chris Hoffman, Jun. 15, 2018, 19 pages.
Microsoft Windows Apps, Desktop Live Wallpapers. https://apps.microsoft.com/store/detail/desktop-live-wallpapers/9NZ370XBFQMG?hl=en-us&gl=US, May 31, 2022, 3 pages.
Gadget Hacks, Change Your Wallpaper Automatically by Time, Day, Location & More, https://android.gadgethacks.com/how-to/change-your-wallpaper-automatically-by-time-day-location-more-0172629, Dallas Thomas, Oct. 14, 2016, 8 pages.
Warmly: Professional Networking in Zoom, Look professional on Zoom, https://www.warmly.ai, May 31, 2022, 8 pages.
Youtube, Get a Contextually-Aware Wallpaper for Android [How-To], https://www.youtube.com/watch?v=KpdelkltyoA&T=78s, Gadget Hacks, Aug. 5, 2016, 3 pages.

\* cited by examiner

*Primary Examiner* — Hemant S Patel
(74) *Attorney, Agent, or Firm* — Young Basile Hanlon & MacFarlane, P.C.

(57) ABSTRACT

An indication of a virtual background (VBG) source is received. A VBG rule is stored in association with the indication of the VBG source. A background setting request that identifies the VBG rule is received from a conference participant of a video conference. A request for a VBG datum is transmitted to the VBG source. A VBG is set for the conference participant using the VBG datum.

20 Claims, 13 Drawing Sheets

SETTING VIRTUAL BACKGROUNDS FROM VIRTUAL BACKGROUND SOURCES

CROSS REFERENCE TO RELATED APPLICATIONS

This application is a continuation of U.S. patent application Ser. No. 17/829,028, filed May 31, 2022, the entire disclosure of which is incorporated herein by reference.

FIELD

This disclosure relates generally to communication management and, more specifically, to dynamic, participant aware virtual backgrounds (VBGs) and to setting virtual backgrounds from virtual background sources.

BRIEF DESCRIPTION OF THE DRAWINGS

This disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
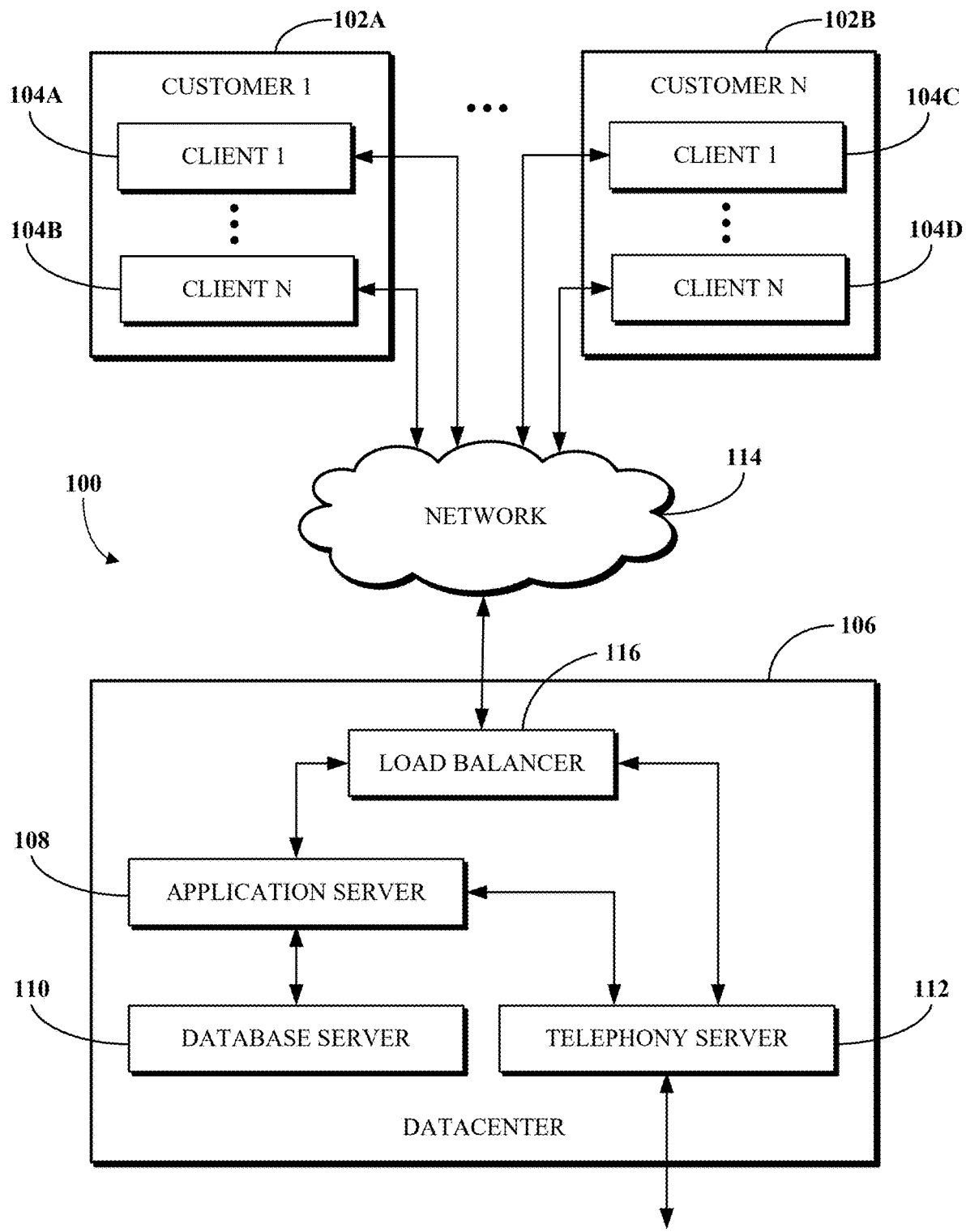
FIG. 1 is a block diagram of an example of an electronic computing and communications system.

A conferencing software, which may be standalone software or part of a software platform such as a unified communications as a service (UCaaS) platform, may allow conference participants to participate in audio-visual conferences. To visually participate in a conference, a user may enable use of their camera (e.g., a front-facing webcam) with the conferencing software. The conferencing software may obtain a video feed of the participant for transmission to other participants of the conference.

A conference participant may use a background replacement media item in place of the actual background of conference participant. A background replacement media item may also be referred to as a VBG. The conference participant may select a VBG within a client-side conferencing software (e.g., a conferencing software) that is included in an application executable on a device of the user. A VBG is media data used to mask (e.g., overlay, overwrite, or replace) portions of one or more images of a video feed of the conference participant. The portion of an image that is masked by the VBG is referred to herein as a background segment of the image. The VBG may be a single image or may include multiple images. For example, the VBG may be an image file, a video file, an animation file (such as a Graphics Interchange Format (GIF) file), or a streaming video.

The conferencing software or a component (e.g., tool, software, or application) associated therewith may process images (e.g., video frames) of an image stream (e.g., a video feed) of the user to replace the actual background captured by the camera with a corresponding (e.g., co-located and co-extensive) portion from the VBG. An image that is captured by the camera of the conference participant is referred to herein as a "camera image," and the image of the conference participant that is transmitted to the other participants for display is referred to herein as an "output image."

A camera image typically includes a likeness (e.g., an image) of the conference participant and other image data. A segmentation software may segment a camera image into a foreground segment that includes at least a substantial portion of the likeness of the user, and a background segment that includes at least a substantial portion of the remainder of the camera image. To illustrate, if the user is sitting in front of the camera, the foreground segment may include the portion of the user within a field of view of the camera (e.g., their head and torso) and potentially one or more objects (e.g., a desk, a keyboard, and/or a mouse) that may be within the field of view of the camera; and the background segment may include everything else in the camera image.

The foreground segment or the background segment may include disjointed (e.g., disconnected or otherwise non-continuous) portions of a camera image. In some configurations, the one or more objects may be considered part of the background segment rather than part of the foreground segment. For simplicity of explanation, the foreground segment is assumed to include the likeness of the user and the background segment is assumed to include the remainder of the image data of the camera image.

As mentioned, the background segment of a camera image may be replaced with a corresponding (e.g., co-located and co-extensive) portion from the VBG. The corresponding portion from the VBG may be referred to as a "replacement background portion" (RBGP). The foreground segment may be overlaid on the VBG to obtain an output image. Equivalently, or similarly, the foreground segment may be combined with the RBGP to obtain the output image. The output image may be transmitted for display on respective display devices of the other participants.

VBGs described above are static in that, for example, once a conference participant sets a VBG, that VBG remains the same until changed again by the conference participant. As such, VBGs set as described above may not elicit sufficient interest or engagement by conference participants.

It is desirable that VBGs reflect actual (e.g., current) conditions, aspects, properties, or the like (collectively, characteristics) related to conference participants or that VBGs of conference participants automatically change as the characteristics change during a conference. Conventional conferencing software lack the technical capabilities for solving or for enabling solutions to such problems. At best, and as described above, conventional conferencing software may merely include technical capabilities that participants can use to set VBGs independent of one another or of any relevant characteristics.

A conferencing software according to implementations of this disclosure can be used to set or dynamically set (e.g., change during an ongoing conference) VBGs for conference participants based on current characteristics of the conference participants. The characteristics can be thought of or considered to be VBG triggers. That is, a value (or a change in value) of a characteristic may cause the conferencing software to set or change the VBG or at least some conference participants. As such, VBGs set according to this disclosure can be dynamic and participant-aware.

Dynamic, participant-aware virtual backgrounds may be enabled using VBG rules. Rather than selecting a VBG, a conference participant may select a VBG rule (e.g., one or more VBG rules) that is used to dynamically set a VBG for the conference participant. A VBG rule may be set for a conference as a whole (i.e., for all participants of the conference) or for a subset (e.g., a group) of the conference participants. For example, a host of a conference may configure the conference to use one or more VBG rules. VBG rules can be used to set virtual backgrounds from virtual background sources.

A VBG rule may identify (e.g., include) a VBG source that provides, based on a characteristic of a conference participant, a VBG datum that the conferencing software can use to set a target VBG for the conference participant. The VBG rule may include a display mode that indicates how the VBG datum is to be used to set the target VBG for a conference participant. The display mode can be selected from a set of display modes including a replacement mode, an overlay mode, a filter mode, other modes, or a combination thereof. To be clear, while the description herein is mostly described with respect to setting or modifying a background segment of a source output image of a conference participant using a VBG datum, in the filter mode, the VBG datum may change (e.g., supplement) the foreground segment.

As used herein, a "source output image" is a camera image or an output image, as described above, of a conference participant the background of which is to be set (or changed) using VBG data obtained using VBG rules. As used herein, a "target output image" refers to the image that results from setting at least a portion of the source output image using the VBG datum. As used here, a "likeness" of a conference participant broadly refers to or includes a representation indicative of the conference participant, such as a portrait, an image, an avatar, a body definition, a contour, or any such representation of the conference participant.

As used herein, setting a target VBG based on or using a VBG datum includes setting or modifying any aspect (e.g., foreground segment, background segment, or any other aspect) of a source output image based on or using VBG data that are obtained from respective VBG sources to obtain a target output image. A "VBG part," as used herein, refers to data that may be, or may be obtained from, a VBG datum and that is used to modify some aspect of a source output image. A "target VBG" of a conference participant, as used herein, may be a VBG part, a combination of VBG parts, and may include an initial VBG. The source output image may include an initial VBG. The target output image includes a target VBG that is set as described herein. Whether the source output image includes an initial VBG or not, the background segment of the source output image is replaced with the target VBG. As will become clearer, the target VBG may in at least some cases may not be an image that replaces the whole of the background segment of the source output image. A target VBG is a participant-aware VBG.

To describe some implementations in greater detail, reference is first made to examples of hardware and software structures used to implement dynamic, participant aware virtual backgrounds. FIG. 1 is a block diagram of an example of an electronic computing and communications system 100, which can be or include a distributed computing system (e.g., a client-server computing system), a cloud computing system, a clustered computing system, or the like.

The system 100 includes one or more customers, such as customers 102A through 102B, which may each be a public entity, private entity, or another corporate entity or individual that purchases or otherwise uses software services, such as a UCaaS platform provider. Each customer can include one or more clients. For example, as shown and without limitation, the customer 102A can include clients 104A through 104B, and the customer 102B can include clients 104C through 104D. A customer can include a customer network or domain. For example, and without limitation, the clients 104A through 104B can be associated or communicate with a customer network or domain for the customer 102A and the clients 104C through 104D can be associated or communicate with a customer network or domain for the customer 102B.

A client, such as one of the clients 104A through 104D, may be or otherwise refer to one or both of a client device or a client application. Where a client is or refers to a client device, the client can comprise a computing system, which can include one or more computing devices, such as a mobile phone, a tablet computer, a laptop computer, a notebook computer, a desktop computer, or another suitable computing device or combination of computing devices. Where a client instead is or refers to a client application, the client can be an instance of software running on a customer device (e.g., a client device or another device). In some implementations, a client can be implemented as a single physical unit or as a combination of physical units. In some implementations, a single physical unit can include multiple clients.

The system 100 can include a number of customers and/or clients or can have a configuration of customers or clients different from that generally illustrated in FIG. 1. For example, and without limitation, the system 100 can include hundreds or thousands of customers, and at least some of the customers can include or be associated with a number of clients.

The system 100 includes a datacenter 106, which may include one or more servers. The datacenter 106 can represent a geographic location, which can include a facility, where the one or more servers are located. The system 100 can include a number of datacenters and servers or can include a configuration of datacenters and servers different from that generally illustrated in FIG. 1. For example, and without limitation, the system 100 can include tens of datacenters, and at least some of the datacenters can include hundreds or another suitable number of servers. In some implementations, the datacenter 106 can be associated or communicate with one or more datacenter networks or domains, which can include domains other than the customer domains for the customers 102A through 102B.

The datacenter 106 includes servers used for implementing software services of a UCaaS platform. The datacenter 106 as generally illustrated includes an application server 108, a database server 110, and a telephony server 112. The servers 108 through 112 can each be a computing system, which can include one or more computing devices, such as a desktop computer, a server computer, or another computer capable of operating as a server, or a combination thereof. A suitable number of each of the servers 108 through 112 can be implemented at the datacenter 106. The UCaaS platform uses a multi-tenant architecture in which installations or instantiations of the servers 108 through 112 is shared amongst the customers 102A through 102B.

In some implementations, one or more of the servers 108 through 112 can be a non-hardware server implemented on a physical device, such as a hardware server. In some implementations, a combination of two or more of the application server 108, the database server 110, and the telephony server 112 can be implemented as a single hardware server or as a single non-hardware server implemented on a single hardware server. In some implementations, the datacenter 106 can include servers other than or in addition to the servers 108 through 112, for example, a media server, a proxy server, or a web server.

The application server 108 runs web-based software services deliverable to a client, such as one of the clients 104A through 104D. As described above, the software services may be of a UCaaS platform. For example, the application server 108 can implement all or a portion of a UCaaS platform, including conferencing software, messaging software, and/or other intra-party or inter-party communications software. The application server 108 may, for example, be or include a unitary Java Virtual Machine (JVM).

In some implementations, the application server 108 can include an application node, which can be a process executed on the application server 108. For example, and without limitation, the application node can be executed in order to deliver software services to a client, such as one of the clients 104A through 104D, as part of a software application. The application node can be implemented using processing threads, virtual machine instantiations, or other computing features of the application server 108. In some such implementations, the application server 108 can include a suitable number of application nodes, depending upon a system load or other characteristics associated with the application server 108. For example, and without limitation, the application server 108 can include two or more nodes forming a node cluster. In some such implementations, the application nodes implemented on a single application server 108 can run on different hardware servers.

The database server 110 stores, manages, or otherwise provides data for delivering software services of the application server 108 to a client, such as one of the clients 104A through 104D. In particular, the database server 110 may implement one or more databases, tables, or other information sources suitable for use with a software application implemented using the application server 108. The database server 110 may include a data storage unit accessible by software executed on the application server 108. A database implemented by the database server 110 may be a relational database management system (RDBMS), an object database, an XML database, a configuration management database (CMDB), a management information base (MIB), one or more flat files, other suitable non-transient storage mechanisms, or a combination thereof. The system 100 can include one or more database servers, in which each database server can include one, two, three, or another suitable number of databases configured as or comprising a suitable database type or combination thereof.

In some implementations, one or more databases, tables, other suitable information sources, or portions or combinations thereof may be stored, managed, or otherwise provided by one or more of the elements of the system 100 other than the database server 110, for example, the one or more of the clients 104A through 104D or the application server 108.

The telephony server 112 enables network-based telephony and web communications from and to clients of a customer, such as the clients 104A through 104B for the customer 102A or the clients 104C through 104D for the customer 102B. Some or all of the clients 104A through 104D may be voice over internet protocol (VOIP)-enabled devices configured to send and receive calls over a network 114. In particular, the telephony server 112 includes a session initiation protocol (SIP) zone and a web zone. The SIP zone enables a client of a customer, such as the customer 102A or 102B, to send and receive calls over the network 114 using SIP requests and responses. The web zone integrates telephony data with the application server 108 to enable telephony-based traffic access to software services run by the application server 108. Given the combined functionality of the SIP zone and the web zone, the telephony server 112 may be or include a cloud-based private branch exchange (PBX) system.

The SIP zone receives telephony traffic from a client of a customer and directs same to a destination device. The SIP zone may include one or more call switches for routing the telephony traffic. For example, to route a VOIP call from a first VOIP-enabled client of a customer to a second VOIP-enabled client of the same customer, the telephony server 112 may initiate a SIP transaction between a first client and the second client using a PBX for the customer. However, in another example, to route a VOIP call from a VOIP-enabled client of a customer to a client or non-client device (e.g., a desktop phone which is not configured for VOIP communication) which is not VOIP-enabled, the telephony server 112 may initiate a SIP transaction via a VOIP gateway that transmits the SIP signal to a public switched telephone network (PSTN) system for outbound communication to the non-VOIP-enabled client or non-client phone. Hence, the telephony server 112 may include a PSTN system and may in some cases access an external PSTN system.

The telephony server 112 includes one or more session border controllers (SBCs) for interfacing the SIP zone with one or more aspects external to the telephony server 112. In particular, an SBC can act as an intermediary to transmit and receive SIP requests and responses between clients or non-client devices of a given customer with clients or non-client devices external to that customer. When incoming telephony traffic for delivery to a client of a customer, such as one of the clients 104A through 104D, originating from outside the telephony server 112 is received, a SBC receives the traffic and forwards it to a call switch for routing to the client.

In some implementations, the telephony server 112, via the SIP zone, may enable one or more forms of peering to a carrier or customer premise. For example, Internet peering to a customer premise may be enabled to ease the migration of the customer from a legacy provider to a service provider operating the telephony server 112. In another example, private peering to a customer premise may be enabled to leverage a private connection terminating at one end at the telephony server 112 and at the other end at a computing aspect of the customer environment. In yet another example, carrier peering may be enabled to leverage a connection of a peered carrier to the telephony server 112.

In some such implementations, a SBC or telephony gateway within the customer environment may operate as an intermediary between the SBC of the telephony server 112 and a PSTN for a peered carrier. When an external SBC is first registered with the telephony server 112, a call from a client can be routed through the SBC to a load balancer of the SIP zone, which directs the traffic to a call switch of the telephony server 112. Thereafter, the SBC may be configured to communicate directly with the call switch.

The web zone receives telephony traffic from a client of a customer, via the SIP zone, and directs same to the application server 108 via one or more Domain Name System (DNS) resolutions. For example, a first DNS within the web zone may process a request received via the SIP zone and then deliver the processed request to a web service which connects to a second DNS at or otherwise associated with the application server 108. Once the second DNS resolves the request, it is delivered to the destination service at the application server 108. The web zone may also include a database for authenticating access to a software application for telephony traffic processed within the SIP zone, for example, a softphone.

The clients 104A through 104D communicate with the servers 108 through 112 of the datacenter 106 via the network 114. The network 114 can be or include, for example, the Internet, a local area network (LAN), a wide area network (WAN), a virtual private network (VPN), or another public or private means of electronic computer communication capable of transferring data between a client and one or more servers. In some implementations, a client can connect to the network 114 via a communal connection point, link, or path, or using a distinct connection point, link, or path. For example, a connection point, link, or path can be wired, wireless, use other communications technologies, or a combination thereof.

The network 114, the datacenter 106, or another element, or combination of elements, of the system 100 can include network hardware such as routers, switches, other network devices, or combinations thereof. For example, the datacenter 106 can include a load balancer 116 for routing traffic from the network 114 to various servers associated with the datacenter 106. The load balancer 116 can route, or direct, computing communications traffic, such as signals or messages, to respective elements of the datacenter 106.

For example, the load balancer 116 can operate as a proxy, or reverse proxy, for a service, such as a service provided to one or more remote clients, such as one or more of the clients 104A through 104D, by the application server 108, the telephony server 112, and/or another server. Routing functions of the load balancer 116 can be configured directly or via a DNS. The load balancer 116 can coordinate requests from remote clients and can simplify client access by masking the internal configuration of the datacenter 106 from the remote clients.

In some implementations, the load balancer 116 can operate as a firewall, allowing or preventing communications based on configuration settings. Although the load balancer 116 is depicted in FIG. 1 as being within the datacenter 106, in some implementations, the load balancer 116 can instead be located outside of the datacenter 106, for example, when providing global routing for multiple datacenters. In some implementations, load balancers can be included both within and outside of the datacenter 106. In some implementations, the load balancer 116 can be omitted.

Figure 2:
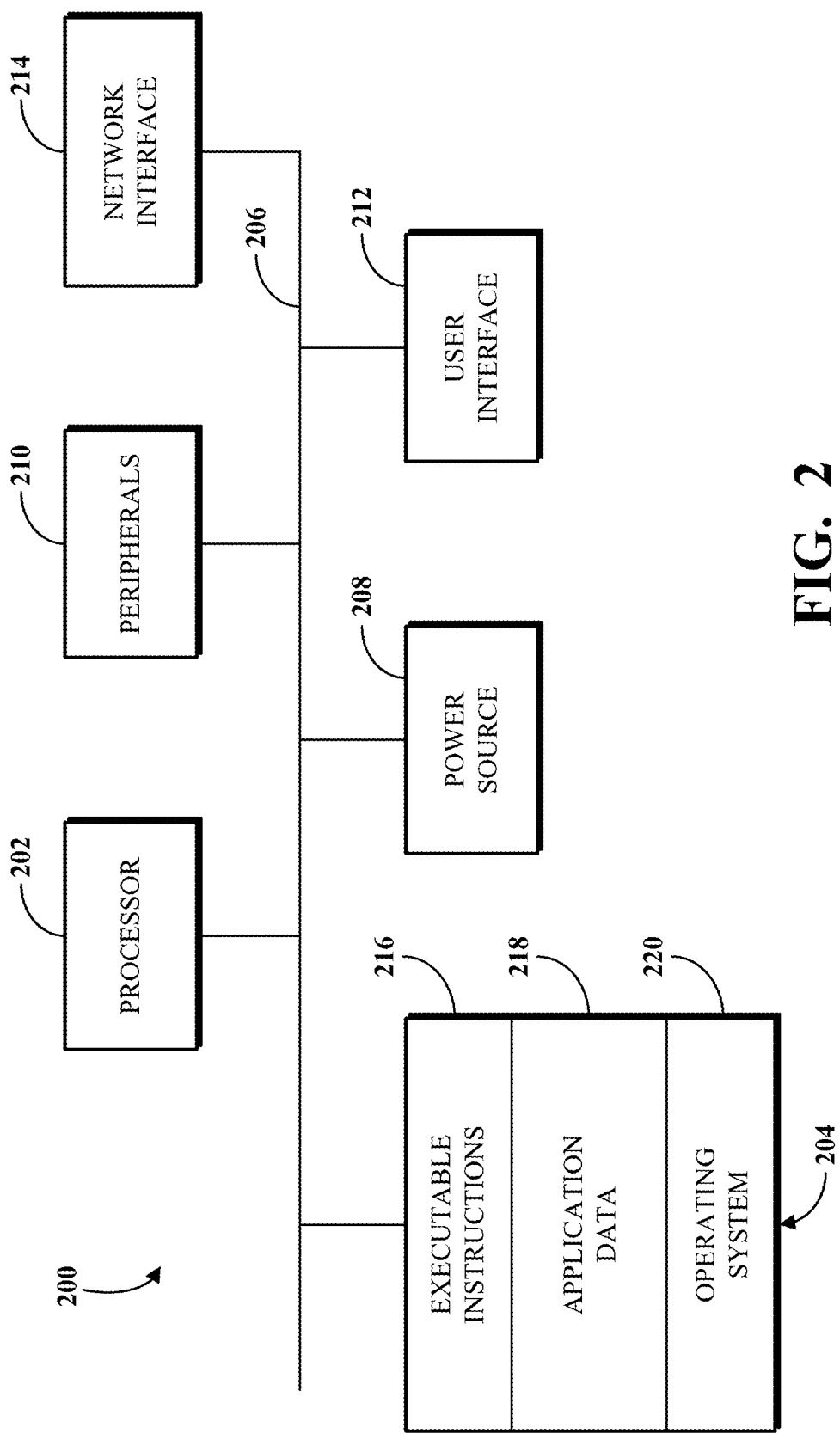
FIG. 2 is a block diagram of an example internal configuration of a computing device of an electronic computing and communications system.

FIG. 2 is a block diagram of an example internal configuration of a computing device 200 of an electronic computing and communications system. In one configuration, the computing device 200 may implement one or more of the clients 104A through 104D, the application server 108, the database server 110, or the telephony server 112 of the system 100 shown in FIG. 1.

The computing device 200 includes components or units, such as a processor 202, a memory 204, a bus 206, a power source 208, peripherals 210, a user interface 212, a network interface 214, other suitable components, or a combination thereof. One or more of the memory 204, the power source 208, the peripherals 210, the user interface 212, or the network interface 214 can communicate with the processor 202 via the bus 206.

The processor 202 is a central processing unit, such as a microprocessor, and can include single or multiple processors having single or multiple processing cores. Alternatively, the processor 202 can include another type of device, or multiple devices, configured for manipulating or processing information. For example, the processor 202 can include multiple processors interconnected in one or more manners, including hardwired or networked. The operations of the processor 202 can be distributed across multiple devices or units that can be coupled directly or across a local area or other suitable type of network. The processor 202 can include a cache, or cache memory, for local storage of operating data or instructions.

The memory 204 includes one or more memory components, which may each be volatile memory or non-volatile memory. For example, the volatile memory can be random access memory (RAM) (e.g., a DRAM module, such as DDR SDRAM). In another example, the non-volatile memory of the memory 204 can be a disk drive, a solid-state drive, flash memory, or phase-change memory. In some implementations, the memory 204 can be distributed across multiple devices. For example, the memory 204 can include network-based memory or memory in multiple clients or servers performing the operations of those multiple devices.

The memory 204 can include data for immediate access by the processor 202. For example, the memory 204 can include executable instructions 216, application data 218, and an operating system 220. The executable instructions 216 can include one or more application programs, which can be loaded or copied, in whole or in part, from non-volatile memory to volatile memory to be executed by the processor 202. For example, the executable instructions 216 can include instructions for performing some or all of the techniques of this disclosure. The application data 218 can include user data, database data (e.g., database catalogs or dictionaries), or the like. In some implementations, the application data 218 can include functional programs, such as a web browser, a web server, a database server, another program, or a combination thereof. The operating system 220 can be, for example, Microsoft Windows®, Mac OS X®, or Linux®; an operating system for a mobile device, such as a smartphone or tablet device; or an operating system for a non-mobile device, such as a mainframe computer.

The power source 208 provides power to the computing device 200. For example, the power source 208 can be an interface to an external power distribution system. In another example, the power source 208 can be a battery, such as where the computing device 200 is a mobile device or is otherwise configured to operate independently of an external power distribution system. In some implementations, the computing device 200 may include or otherwise use multiple power sources. In some such implementations, the power source 208 can be a backup battery.

The peripherals 210 includes one or more sensors, detectors, or other devices configured for monitoring the computing device 200 or the environment around the computing device 200. For example, the peripherals 210 can include a geolocation component, such as a global positioning system location unit. In another example, the peripherals can include a temperature sensor for measuring temperatures of components of the computing device 200, such as the processor 202. In some implementations, the computing device 200 can omit the peripherals 210.

The user interface 212 includes one or more input interfaces and/or output interfaces. An input interface may, for example, be a positional input device, such as a mouse, touchpad, touchscreen, or the like; a keyboard; or another suitable human or machine interface device. An output interface may, for example, be a display, such as a liquid crystal display, a cathode-ray tube, a light emitting diode display, or other suitable display.

The network interface 214 provides a connection or link to a network (e.g., the network 114 shown in FIG. 1). The network interface 214 can be a wired network interface or a wireless network interface. The computing device 200 can communicate with other devices via the network interface 214 using one or more network protocols, such as using Ethernet, transmission control protocol (TCP), internet protocol (IP), power line communication, an IEEE 802.X protocol (e.g., Wi-Fi, Bluetooth, or ZigBee), infrared, visible light, general packet radio service (GPRS), global system for mobile communications (GSM), code-division multiple access (CDMA), Z-Wave, another protocol, or a combination thereof.

Figure 3:
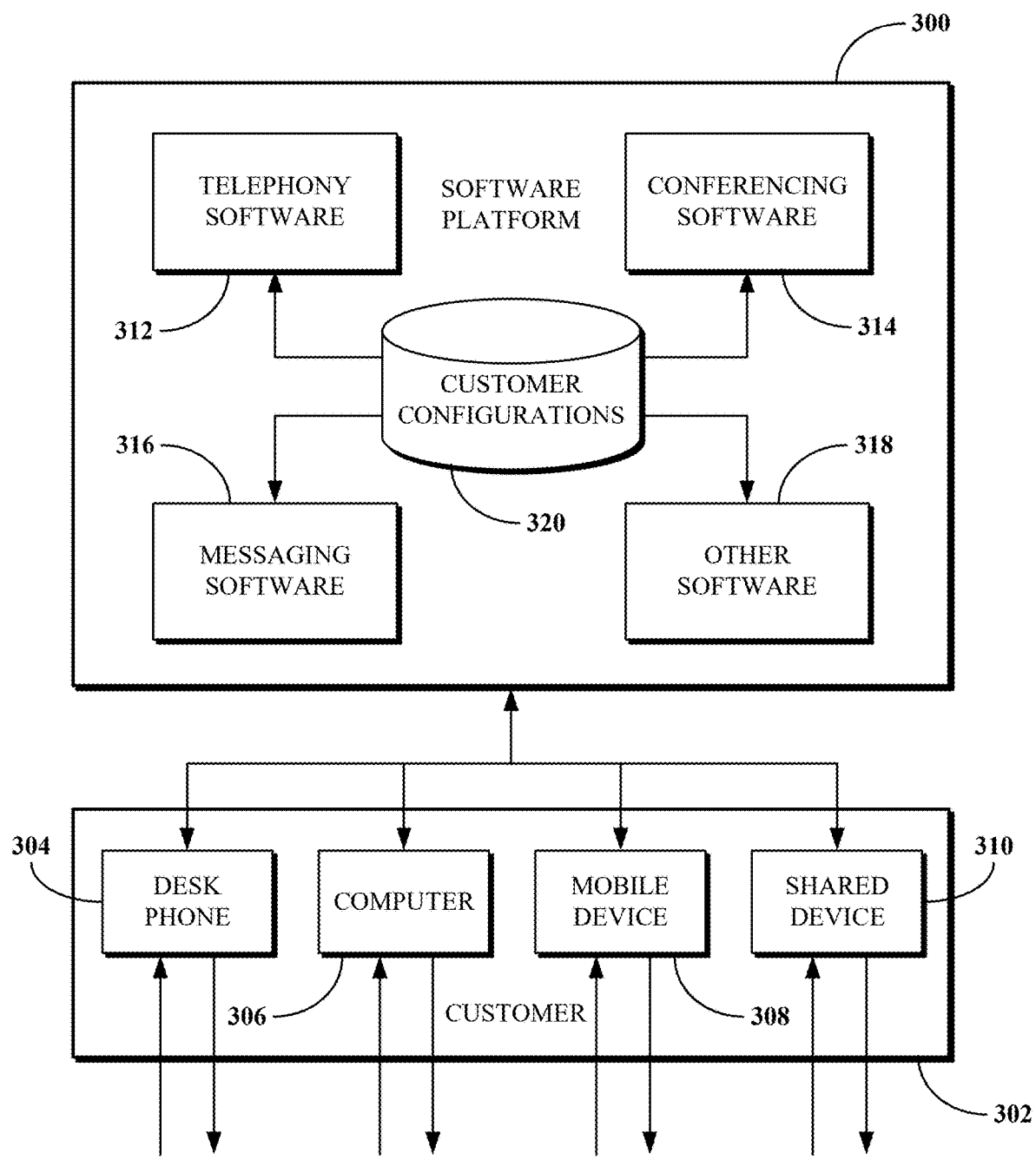
FIG. 3 is a block diagram of an example of a software platform implemented by an electronic computing and communications system.

FIG. 3 is a block diagram of an example of a software platform 300 implemented by an electronic computing and communications system, for example, the system 100 shown in FIG. 1. The software platform 300 is a UCaaS platform accessible by clients of a customer of a UCaaS platform provider, for example, the clients 104A through 104B of the customer 102A or the clients 104C through 104D of the customer 102B shown in FIG. 1. The software platform 300 may be a multi-tenant platform instantiated using one or more servers at one or more datacenters including, for example, the application server 108, the database server 110, and the telephony server 112 of the datacenter 106 shown in FIG. 1.

The software platform 300 includes software services accessible using one or more clients. For example, a customer 302 as shown includes four clients 304 through 310 (e.g., the clients 304, 306, 308, 310)—a desk phone, a computer, a mobile device, and a shared device. The desk phone is a desktop unit configured to at least send and receive calls and includes an input device for receiving a telephone number or extension to dial to and an output device for outputting audio and/or video for a call in progress. The computer is a desktop, laptop, or tablet computer including an input device for receiving some form of user input and an output device for outputting information in an audio and/or visual format. The mobile device is a smartphone, wearable device, or other mobile computing aspect including an input device for receiving some form of user input and an output device for outputting information in an audio and/or visual format. The desk phone, the computer, and the mobile device may generally be considered personal devices configured for use by a single user. The shared device is a desk phone, a computer, a mobile device, or a different device which may instead be configured for use by multiple specified or unspecified users.

Each of the clients 304 through 310 includes or runs on a computing device configured to access at least a portion of the software platform 300. In some implementations, the customer 302 may include additional clients not shown. For example, the customer 302 may include multiple clients of one or more client types (e.g., multiple desk phones or multiple computers) and/or one or more clients of a client type not shown in FIG. 3 (e.g., wearable devices or televisions other than as shared devices). For example, the customer 302 may have tens or hundreds of desk phones, computers, mobile devices, and/or shared devices.

The software services of the software platform 300 generally relate to communications tools, but are in no way limited in scope. As shown, the software services of the software platform 300 include telephony software 312, conferencing software 314, messaging software 316, and other software 318. Some or all of the software 312 through 318 uses customer configurations 320 specific to the customer 302. The customer configurations 320 may, for example, be data stored within a database or other data store at a database server, such as the database server 110 shown in FIG. 1.

The telephony software 312 enables telephony traffic between ones of the clients 304 through 310 and other telephony-enabled devices, which may be other ones of the clients 304 through 310, other VOIP-enabled clients of the customer 302, non-VOIP-enabled devices of the customer 302, VOIP-enabled clients of another customer, non-VOIP-enabled devices of another customer, or other VOIP-enabled clients or non-VOIP-enabled devices. Calls sent or received using the telephony software 312 may, for example, amongst the clients 304 through 310 be sent or received using the desk phone, a softphone running on the computer, a mobile application running on the mobile device, or using the shared device that includes telephony features.

The telephony software 312 further enables phones that do not include a client application to connect to other software services of the software platform 300. For example, the telephony software 312 may receive and process calls from phones not associated with the customer 302 to route that telephony traffic to one or more of the conferencing software 314, the messaging software 316, or the other software 318.

The conferencing software 314 enables audio, video, and/or other forms of conferences between multiple participants, such as to facilitate a conference between those participants. In some cases, the participants may all be physically present within a single location, for example, a conference room, in which the conferencing software 314 may facilitate a conference between only those participants and using one or more clients within the conference room. In some cases, one or more participants may be physically present within a single location and one or more other participants may be remote, in which the conferencing software 314 may facilitate a conference between all of those participants using one or more clients within the conference room and one or more remote clients. In some cases, the participants may all be remote, in which the conferencing software 314 may facilitate a conference between the participants using different clients for the participants. The conferencing software 314 can include functionality for hosting, presenting scheduling, joining, or otherwise participating in a conference. The conferencing software 314 may further include functionality for recording some or all of a conference and/or documenting a transcript for the conference.

The messaging software 316 enables instant messaging, unified messaging, and other types of messaging communications between multiple devices, such as to facilitate a chat or other virtual conversation between users of those devices. The unified messaging functionality of the messaging software 316 may, for example, refer to email messaging which includes a voicemail transcription service delivered in email format.

The other software 318 enables other functionality of the software platform 300. Examples of the other software 318 include, but are not limited to, device management software, resource provisioning and deployment software, administrative software, third party integration software, and the like. In one particular example, the other software 318 can include virtual background software, for example, for setting dynamic, participant-aware virtual backgrounds for conference participants, for setting virtual backgrounds from virtual background sources, or both.

The software 312 through 318 may be implemented using one or more servers, for example, of a datacenter such as the datacenter 106 shown in FIG. 1. For example, one or more of the software 312 through 318 may be implemented using an application server, a database server, and/or a telephony server, such as the servers 108 through 112 shown in FIG. 1. In another example, one or more of the software 312 through 318 may be implemented using servers not shown in FIG. 1, for example, a meeting server, a web server, or another server. In yet another example, one or more of the software 312 through 318 may be implemented using one or more of the servers 108 through 112 and one or more other servers. The software 312 through 318 may be implemented by different servers or by the same server.

Features of the software services of the software platform 300 may be integrated with one another to provide a unified experience for users. For example, the messaging software 316 may include a user interface element configured to initiate a call with another user of the customer 302. In another example, the telephony software 312 may include functionality for elevating a telephone call to a conference. In yet another example, the conferencing software 314 may include functionality for sending and receiving instant messages between participants and/or other users of the customer 302. In yet another example, the conferencing software 314 may include functionality for file sharing between participants and/or other users of the customer 302. In some implementations, some or all of the software 312 through 318 may be combined into a single software application run on clients of the customer, such as one or more of the clients 304 through 310.

Figure 4:
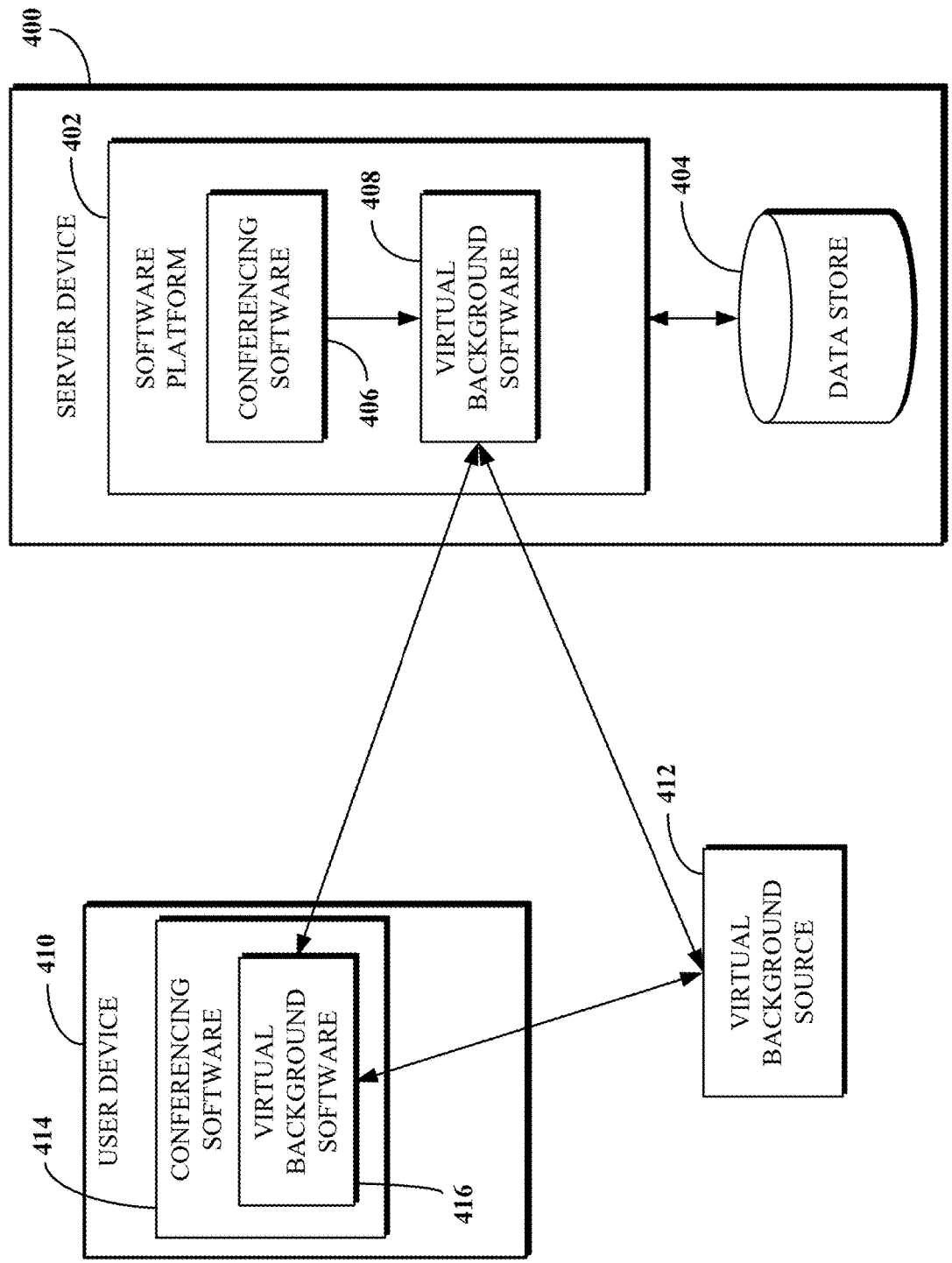
FIG. 4 is a block diagram of an example of a server for setting participant-aware VBGs or for setting virtual backgrounds from virtual background sources.

FIG. 4 is a block diagram of an example of a server device 400 for setting participant-aware VBGs or for setting virtual backgrounds from virtual background sources. The server device 400 may include VBG rules that can be used to set target VBGs for one or more conference participants. As shown, the server device 400 implements or includes a software platform 402 and a data store 404. The server device 400 can be one or more servers implemented by or included in a datacenter, such as the datacenter 106 of FIG. 1. The software platform 402 is shown as including conferencing software 406 and VBG software 408. In an example, the conferencing software 406 may include the VBG software 408.

The software platform 402 provides conferencing services (e.g., capabilities or functionality) via the conferencing software 406. The software platform 402 can be or can be part of the software platform 300 of FIG. 3. The conferencing software 406 can be variously implemented in connection with the software platform 402. In some implementations, the conferencing software 406 can be included in or can work in conjunction with one or more of the software 312 through 318 of FIG. 3. For example, the conferencing software 406 may be or may be integrated within the telephony software 312. In another example, the conferencing software 406 may be or may be integrated within the conferencing software 314.

The data store 404 can store data related to conferences and data related to users who have participated or may participate in one or more conferences. The data store 404 can be included in or implemented by a database server, such as the database server 110 of FIG. 1. The data store 404 can include data related to scheduled or ongoing conferences and data related to users of the software platform 402. For example, the data store 404 can include associations between users and VBG rules (e.g., a VBG rule preference). To illustrate, the data store 404 may store, with respect to a user, a preference indicating that a particular VBG rule is to be used to set the target VBG of the user in all conferences that the user participates in. As another illustration, the data store 404 may store a set of VBG rules that are created by or otherwise associated with the user. The data store 404 may also store media items that may be used by at least some of the VBG rules, such as to create a mapping, as described below.

One user device 410 of a conference participant is shown as being connected to the server device 400 indicating that the conference participant is participating in a conference. However, as can be appreciated, many more user devices may simultaneously connect to the conference. Similarly, a software platform 402 implemented using the server device 400 can enable many conferences to be concurrently active. As further described below, a target VBG can be used (e.g., selected or set) for the conference participant based on one of more VBG rules.

The user device 410 can be a device of a user who is configured (e.g., enabled) to or otherwise can join a conference. The user device 410 may, for example, be one of the clients 304 through 310 of FIG. 3. Alternatively, the user device 410 may be a device other than a client. The user device 410 may include a conferencing software 414. The conferencing software 414 can include or work in conjunction with a VBG software 416. The user device 410 is shown as including the conferencing software 414, which includes VBG software 416. In an example, the VBG software 416 may be separate from, but works in conjunction with, the conferencing software 414. The user device 410 can include a camera device (not shown) that can be configured to capture images of the user while the user is in a conference. At least some of the camera images (or output images obtained therefrom) may be transmitted by the user device 410 to the server device 400, which may in turn transmit the images to devices of other conference participants.

In some implementations, the user device 410 may communicate directly with the devices of other participants (not shown). The user device 410 can directly communicate with one or more such other devices using peer-to-peer, real-time communications. As such, for example, source or target output images obtained at the user device 410 can be received directly at another user device, and vice versa.

The VBG software 408 can be used to set or to facilitate the setting of target VBGs of conference participants using VBG data obtained based on respective VBG rules. The VBG software 416 can also be used to set or to facilitate the setting of target VBGs at the user device 410. A VBG software may identify a VBG rule (e.g., an indication or an identifier therefor). The VBG rule may be received from a conference participant. For example, and as further described with respect to FIG. 7B, the VBG software may present or cause to be presented to the conference participant a list of available VBG rules and the conference participant may select one or more of the available VBG rules.

A VBG datum may be obtained from a VBG source, such as a VBG source 412. While FIG. 4 includes only one VBG source, there can be many different VBG sources, and different VBG rules may be configured to use or obtain VBG data from the different VBG sources. A VBG source, such as the VBG source 412, can be implemented in a variety of ways and can communicate with the VBG software in a variety of ways. To illustrate, and as further described below, a VBG source may be a public or a private resource (application) that may be accessible via an Application Programming Interface (API).

In an example, the server device 400 (e.g., the VBG software 408 therein) may receive a source output image of the conference participant. The VBG software 408 may obtain (e.g., generate, assemble, or create) a target output image from the source output image based on a VBG rule. The target output image may be transmitted for display at devices of other conference participants, which may include the user device 410 itself. In another example, the server device 400 may transmit a VBG rule (i.e., an indication thereof, such as an identifier) to the user device 410. The VBG software 416 of the user device 410 may use the VBG rule to obtain a VBG datum. The VBG software 416 can use the VBG datum to obtain a target output image that can be transmitted to other conference participants via the server device 400. In another example, the VBG software 408 may use a VBG rule to obtain a VBG datum. The VBG software 408 can transmit the VBG datum to the user device 410. The VBG software 416 of the user device 410 can use the VBG datum to generate a target output image that is transmitted for display at devices of conference participants.

The VBG source 412 provides VBG data. The VBG source 412 may provide a VBG datum in response to a request from a VBG software, which transmits a request to the VBG source 412 according to a VBG rule (i.e., according to configurations of the VBG rule). The VBG source 412 may push the VBG datum to a VBG software, which may be the VBG software 408 or the VBG software 416. As mentioned, a VBG rule identifies the VBG source 412. The VBG rule may also include a display mode. The VBG software determines how to use the VBG datum based on the display mode.

A VBG source, such as the VBG source 412, may be or otherwise refer to a computing device (e.g., a server), such as the computing device 200 of FIG. 2, or an application executing or is available therein. Where a VBG source is or refers to a computing device, the VBG source can comprise a computing system, which can include one or more computing devices. Where a VBG source instead is or refers to an application, the VBG source can be an instance of software running on a computing device. In some implementations, a VBG source can be implemented as a single physical unit or as a combination of physical units. While FIG. 4 shows the VBG source 412 as being external to the software platform 402, in some examples, the VBG source 412 can be a tool, software, a program, or the like that executes within or in conjunction with the software platform 402.

Figure 5:
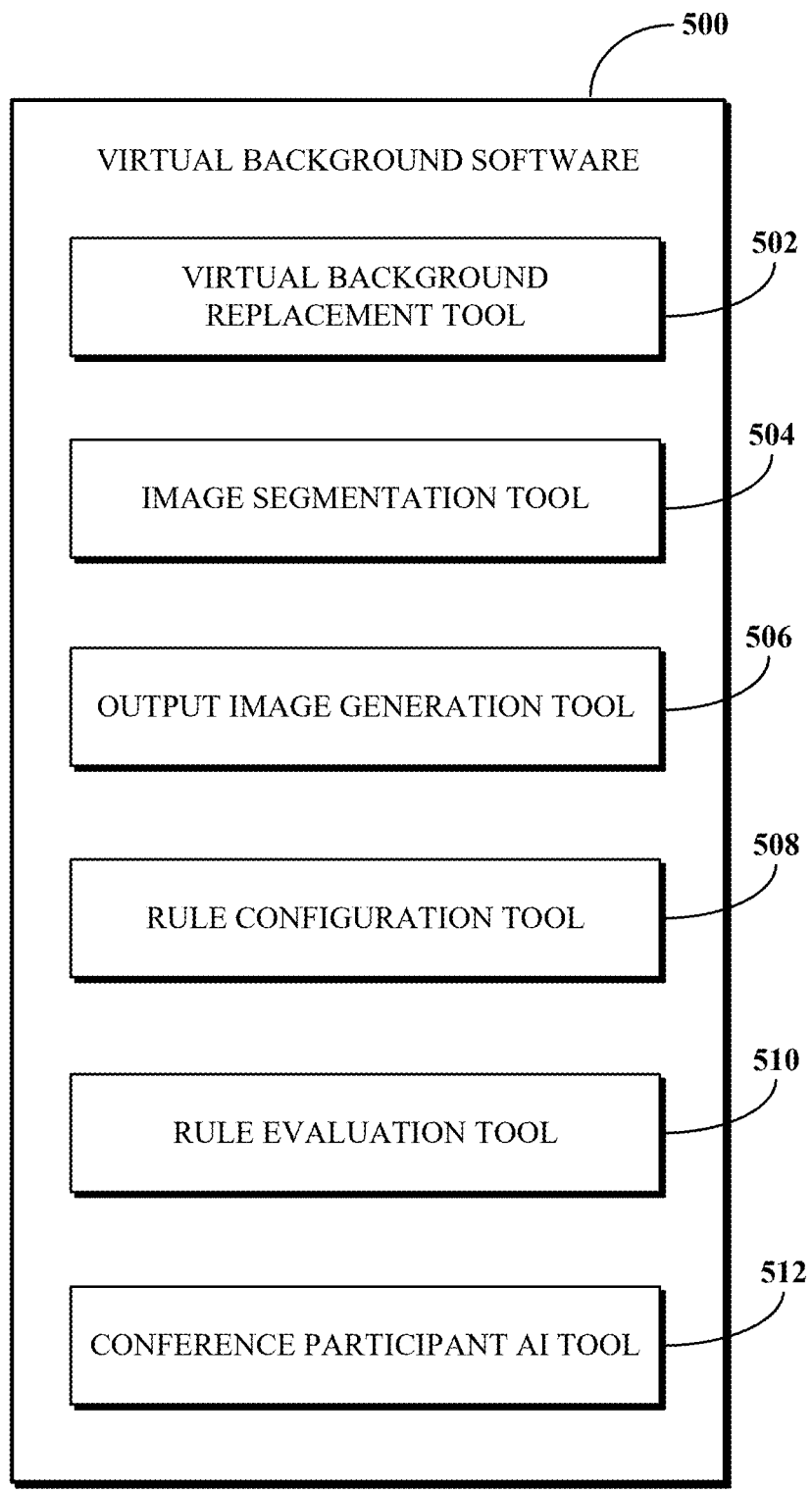
FIG. 5 is a block diagram of example functionality of VBG software.

FIG. 5 is a block diagram of example functionality of VBG software 500, which may be, for example, one or more of the VBG software 408 or the VBG software 416 of FIG. 4. The VBG software 500 includes tools, such as programs, subprograms, functions, routines, subroutines, operations, executable instructions, and/or the like for, inter alia and as further described below, setting virtual backgrounds that are participant aware.

At least some of the tools of the VBG software 500 can be implemented as respective software programs that may be executed by one or more computing devices, such as the computing device 200 of FIG. 2. A software program can include machine-readable instructions that may be stored in a memory such as the memory 204, and that, when executed by a processor, such as processor 202, may cause the computing device to perform the instructions of the software program.

As shown, the VBG software 500 includes a VBG replacement tool 502, an image segmentation tool 504, an output image generation tool 506, a rule configuration tool 508, a rule evaluation tool 510, and a conference participant artificial intelligence (AI) tool 512. In some implementations, the VBG software 500 can include more or fewer tools. In some implementations, some of the tools may be combined, some of the tools may be split into more tools, or a combination thereof. A VBG software that is implemented by or is available at a client may not include some of the tools of the VBG software 500. For example, the conference participant AI tool 512 may not be available in the VBG software 416 of FIG. 4. Statements herein such as "a tool/software/etc. of a conference participant" should be understood to mean "a tool/software/etc. that is executing or is available at a target device of the conference participant."

The VBG replacement tool 502 can identify a VBG rule for a conference participant. The VBG rule may be identified in any number of ways. In an example, the VBG rule may be identified based on a selection of the VBG rule by the conference participant. The conference participant may select the VBG rule for a particular conference. For example, in the process of joining or at any time during the conference, the conference participant may select the VBG rule. In another example, the conference participant may set a VBG rule preference such that a specific VBG rule is used, by default, when the conference participant joins any conference.

A VBG rule may be evaluated (e.g., performed, executed, or parsed) to obtain a VBG datum that is then used to set (e.g., select, configure, or determine) the target VBG for the conference participant. Using the VBG datum to set the target VBG may include obtaining a VBG part using the VBG datum and using the VBG part to set the target VBG. Evaluating a VBG rule for a conference participant includes transmitting (or causing to be transmitted) by the VBG software, or one or more tools therein, a request to the VBG source and handling (e.g., processing) a received VBG datum according to configurations of the VBG rule to set or modify a VBG of the conference participant.

The image segmentation tool 504 may obtain a segmentation of an image. In an example, the image segmentation tool 504 may be or may include a machine learning model that is trained to obtain segmentations of images. In an example, the image segmentation tool 504 may use a service (e.g., a cloud-based service) to obtain the segmentation. Segmenting an image can include obtaining a foreground segment, a background segment, or both from the image. The image segmentation tool 504 can be used to segment a source output image to obtain a source foreground segment from the source output image. The foreground segment includes a likeness of a conference participant.

The image segmentation tool 504, when executing at a user device (such as when the image segmentation tool 504 is part of the VBG software 416 of FIG. 4), may receive a camera image and obtain at least a source foreground segment from the camera image. The output image generation tool 506 may combine the source foreground segment with a target VBG that is obtained from the rule evaluation tool 510. The image segmentation tool 504, when executing at a server (such as when the image segmentation tool 504 is part of the VBG software 408 of FIG. 4), may receive a source output image and obtain at least a source foreground segment from the camera image.

The output image generation tool 506 is used to obtain a target output image. The output image generation tool 506, combines different aspects of a source output image to obtain the target output image for display on devices of conference participants. The output image generation tool 506 may combine a source foreground segment with a target VBG that is obtained from the rule evaluation tool 510.

As already mentioned, and as further described below, a VBG rule may include or indicate a display mode. In the replacement mode, the output image generation tool 506 uses a VBG datum to set the background segment of a source output image to obtain a target output image. That is, the output image generation tool 506 combines the source foreground segment with a target VBG that is obtained using the VBG datum to obtain the target output image. In the case of the overlay mode, a VBG datum can be used to supplement the background segment of a source output image with additional background data. As such, the additional background data may be overlaid onto (combined with) the source background segment of the source output image to obtain a target output image. In the filter mode, a VBG datum can be used to supplement the source foreground segment of a source output image with additional foreground data. As such, the additional foreground data may be overlaid onto (combined with) the foreground segment of the source output image to obtain a target output image. Regardless of the display mode, VBG data (or VBG parts obtained therefrom) are said to be used to modify a source output image and to obtain a target output image.

The rule configuration tool 508 can be used to create or modify VBG rules. The rule configuration tool 508 can be used to set VBG rule definitions and configurations, which may be stored in a data store, such as data store 404 of FIG. 4. The rule configuration tool 508 may present or cause to be presented user interfaces via which users may configure the VBG software 500 with VBG rules. In an example, the VBG rules may be specified (e.g., coded or described) into a configuration file (such as a text file) that the rule configuration tool 508 may read (e.g., parse) to generate VBG rules that are then stored in the data store. In an example, the rule configuration tool 508 may display or cause to be displayed user interfaces (UIs), such as described with respect to FIG. 6.

The rule evaluation tool 510 evaluates VBG rules to obtain respective VBG data. As mentioned, a VBG rule may be obtained from a conference participant, who may select the VBG rule during a conference, or who may have configured the VBG rule as a default VBG rule. In another example, the VBG rule may be obtained from a conference participant (such as the conference host) who may be enabled to set the VBG rule for other conference participants. In an example, a selected VBG rule may be transmitted to the respective VBG software of each of the selected conference participants. The respective VBG software evaluates the VBG rule to obtain respective VBG data for the corresponding conference participants.

The conference participant AI tool 512 can be used to identify characteristics of the conference participants that can be useful in identifying VBG rules to recommend or to set for at least some of the conference participants. To illustrate, the conference participant AI tool 512 may determine that the conference participants are geographically dispersed. As such, the conference participant AI tool 512 may recommend or set a VBG rule that obtains respective VBG data related to time zones of the conference participants. As another illustration, the conference participant AI tool 512 may group the conference participants into groups based on their characteristics and set VBG rules based on the groupings.

In an example, the conference participant AI tool 512 may present one or more recommended VBG rules to one or more of the conference participants. Each of the conference participants can select a VBG rule. In another example, the recommended VBG rules may be presented to the conference host. A VBG rule selected by the conference host can be transmitted to a conference participants (i.e., to the respective VBG software of each of the conference participants).

Figure 6:
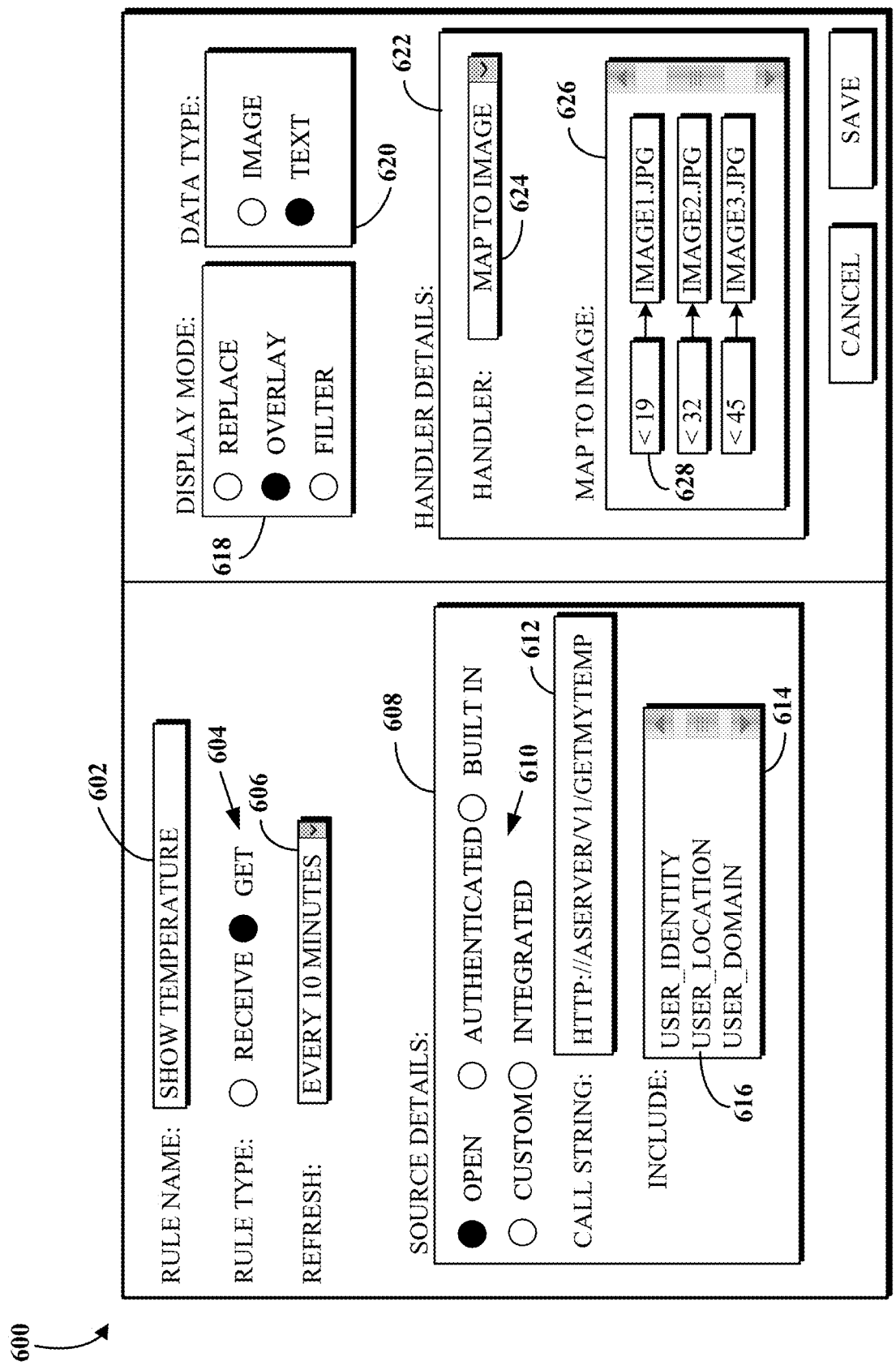
FIG. 6 is an example of user interface for configuring VBG rules.

FIG. 6 is an example of a UI 600 for configuring VBG rules. The UI 600 may be presented to a user who is configured (e.g., authorized or enabled) to create or modify VBG rules. The UI 600 enables the user to set or modify configurations of VBG rules. In an example, any conference participant can create VBG rules. The UI 600 may be generated by a VBG software 500, such as the VBG software 408 of FIG. 4, and displayed at a user device, such as the user device 410 of FIG. 4.

While some UI controls, fields, configurations, and interactions are described with respect to the UI 600, the disclosure herein is in no way limited to or by such controls, fields, configurations, or interactions. Other controls, fields, configurations, and interactions are possible. Additionally, while not specifically shown in the UI 600, depending on certain user selections, other fields or controls may become available, visible, unavailable, or invisible, or other UIs may become visible to that the user may provide additional configurations.

At a high level, a VBG software can use the configurations of a VBG rule to evaluate the VBG rule. The configurations may include a VBG source (e.g., where VBG data are obtained from), how and how often a VBG datum is to be obtained or received from the VBG source, a display mode of a VBG part obtained based on the VBG datum, the type of VBG datum, and a handler that can be used for obtaining (e.g., mapping) the VBG datum to the VBG part. Obtaining the VBG part from the VBG datum can include transforming the VBG datum to the VBG part, mapping the VBG datum to the VBG part, or any way of obtaining a VBG part using or based on the VBG datum. The UI 600 illustrates creating a VBG rule that creates an overlay on the background of the conference participant showing the current outside temperature at the location of the conference participant.

The description of FIG. 6 describes some configurations options of VBG rules as well as the effects (operations) of such configuration options when a VBG rule is being evaluated by the VBG software for a target conference participant. The VBG software evaluates a VBG rule configured via the UI 600 in response to the VBG rule being identified for the target conference participant. The VBG rule may be identified in response to the target conference participant selecting the VBG rule, in response to another conference participant indicating that the VBG rule is to be used for the target conference participant, or any other way of identifying the VBG rule for the target conference participant.

A VBG name field 602 allows the user to provide a name for the VBG rule being configured. In this case, the rule name is being set to "SHOW TEMPERATURE." The user may provide a rule type via rule type options 604. The rule type indicates to the VBG software how the VBG datum are obtained from the VBG source. The VBG rule may be of a RECEIVE type, a GET type, or some other type (not shown).

In the case of the RECEIVE type, the VBG software receives the VBG datum without making an explicit request to the VBG source. In an example, the VBG software may transmit an initial request to the VBG source indicating that the VBG source is to transmit VBG data to the VBG software. That is, the initial request is intended to register an interest of the VBG software in receiving VBG data from the VBG source. The VBG source may transmit the VBG datum according to programming (e.g., logic) of the VBG source that determines when VBG data are to be transmitted to the VBG software. The initial request may include a callback handler.

The callback handler of the VBG software may receive VBG data from the VBG source. That is, the VBG source transmits a request (e.g., a call) to the callback handler when a VBG datum is to be transmitted from the VBG source to the VBG software. In an example, the user may provide a name of an API (i.e., the callback handler) in the UI 600. The callback handler may be transmitted in the initial request. The user may indicate the characteristics (of a conference participant) required by the API and that the VBG software transmits to the VBG source when the VBG rule is evaluated. In another example, the API to use for indicating the interest may be well known. As such, the user may not need to provide the API. The user may provide configurations of the VBG source via VBG source configurations 608.

In the case of the GET type, the user provides configurations of the VBG source via the VBG source configurations 608. When evaluating the VBG rule, the VBG source transmits a request to the VBG source according to the configurations and receives the VBG datum from the VBG source.

The VBG rule may be configured to have a frequency parameter (i.e., a background-update frequency), which is configured via a field 606. In the case of the GET type, the VBG software transmits requests to the VBG source at the configured frequency parameter. In the case of the RECEIVE type, the VBG software may transmit a request to the VBG source indicating a desired frequency of receiving VBG datum. Every time VBG datum is received from the VBG source, the VBG software may update the target VBG based on or using the VBG datum. In an example, the VBG software may determine whether the same VBG datum was received as a last received VBG. If they are the same, the VBG software may ignore the received VBG datum. That is, the VBG software does not set the target VBG using the VBG datum. Via the field 606, the user can indicate that the VBG rule is to be evaluated only once during a conference.

In a VBG source configurations 608 section, the user can provide configurations of the VBG source. The VBG source can be a system, a tool, a software, a program, a subprogram, a function, a routine, a subroutine, an operation, executable instructions, and/or the like from which the VBG datum can be received. Via a type selector 610, the user can select a VBG source type. The VBG source type can be used by the VBG software to select an optimal technique for communicating with the VBG source, select the interaction workflow with the VBG source, and infer what data (such as information regarding the target conference participant) may be available to the VBG source. The UI 600 illustrates that the VBG source type can be one of OPEN, AUTHENTICATED, CUSTOM, or BUILT IN. However, other VBG source types are possible.

The VBG source type of OPEN indicates that the VBG source does not require user credentials (e.g., authentication). In the call request field 612, the user can provide a request string that the VBG software can use to obtain VBG data from the source string. The UI 600 illustrates that the call string in this case is a REpresentational State Transfer (REST) request. However, this disclosure is not so limited and other ways of submitting requests to the VBG source are possible.

The VBG source type AUTHENTICATED indicates that the VBG source requires user credentials in order to respond to the request call provided in the call request field 612. At the time of evaluating the VBG rule, the VBG software can obtain the credentials from the target conference participant for whom the VBG rule is being evaluated. In an example, the target conference participant may direct the VBG software to store the credentials for later use with the VBG rule. In another example, the VBG source may not necessarily require the specific credentials of a target conference participant. As such, the VBG rule may be configured to use the credentials of another user who may be privileged, within the VBG source, to access or obtain the VBG data from the VBG source.

The VBG source type of BUILT IN indicates that the user is selecting a VBG source that is implemented or provided by the VBG software itself. In response to the user selecting the BUILT IN VBG source type, the call request field 612 may display a list of available VBG sources provided by the VBG software and from which the user can select the desired built-in VBG source. Depending on the implementation of a built-in VBG source, the UI 600 may display additional fields that the user can use to provide additional data that the VBG software can use when calling the built-in VBG source. An example of a BUILT IN VBG source may be a polling application, which is further described below. A BUILT IN VBG source type may also require authentication, which may be configured as described with respect to a VBG source of type AUTHENTICATED.

The VBG source type of CUSTOM indicates that the VBG source may be an application that may be specifically built to provide VBG data to the VBG software. The call request field 612 may display fields that enable the user to provide, for example, a script that the VBG software can use to communicate with and receive VBG data from the VBG source. The script may be provided in a programming or scripting language that is supported by the VBG software. The user may type the script in the call request field 612 or may provide (e.g., upload) a file that includes the script. The VBG software may validate the script (such as for syntax errors) prior to saving the script in association with the VBG rule. In an example, the VBG software 500 may store a compiled version of the script for use during VBG rule evaluation. In another example, the script may be compiled on demand at the time that the VBG rule is evaluated.

The VBG source type of INTEGRATED indicates that the VBG source is such that it is developed using or includes a library (such as a Software Development Kit (SDK)) of the VBG software or a software platform that includes the VBG software. As such, the VBG source may have, be allowed, or be granted access to at least some conference participant data regarding (e.g., related to or associated with) a target conference participant who may be using the VBG source. Such conference participant data may be stored in a database, such as the data store 404 of FIG. 4. The VBG source may use APIs of the SDK to obtain such conference participant data from the VBG software.

In a call request field 612, the user can provide calling data that the VBG software uses to communicate with the VBG source at a time of evaluating the VBG rule. The calling data can be or include parameters, settings, configurations, tokens (such as JavaScript Object Notation (JSON) Web Tokens (JWT)), access tokens (as may be required for an OAuth-based application), or other calling data. The call request field 612 may be presented differently depending on the selected VBG source type. That is, the call request field 612 may be presented (displayed) using different fields and controls to enable the user to enter the calling data necessary for the VBG software to communicate with the VBG source based on the VBG source type.

The call string may include characteristic placeholders that the VBG software replaces with actual characteristics (e.g., characteristic values) of the conference participant at the time that the VBG rule is evaluated. The user can select characteristic placeholders to add to the call request field 612 from an available characteristic placeholder list 614.

At least some of the characteristics placeholders may be provided by (e.g., known to) the VBG software. As illustrated in the UI 600, the characteristics placeholders provided by the VBG software may include USER_IDENTITY, USER_LOCATION (i.e., a characteristic 616), and USER_DOMAIN. These characteristic placeholders are for mere illustration and this disclosure is not limited to or by these illustrative characteristic placeholders.

USER_IDENTITY may be resolved (when the VBG rule is evaluated) to an identifier of the target conference participant, which may be obtained from the conference participant at the time that the conference participant joined a conference. USER_LOCATION may be resolved to a geographic location (e.g., a zip code, a city, a state, or a country) of the target conference participant and may be obtained from profile data of the conference participant. The VBG software may resolve the USER_DOMAIN characteristic placeholder from an email address associated with the conference participant.

As shown in the UI 600, the call string does not explicitly include characteristic placeholders. This is so because it may be known to the user that the called API (i.e., GETMYTEMP) includes the IP address of the device of the target conference participant in the HTTP request and which the API GETMYTEMP uses to determine the temperature at the site of the requestor. On the other hand, if the VBG rule were to be evaluated at a server, such as the server device 400 of FIG. 4, then the location of the server may be different from that of the device of the target conference participant. As such, the location of the target conference participant may be explicitly included in the VBG request. If the user were to add the characteristic 616 to the call request field 612, then the call request may become HTTP://ASERVER/VI/GETMYTEMP/[USER_LOCATION].

When the VBG rule is evaluated, the VBG software replaces the characteristic placeholder with an actual value of the USER_LOCATION. To illustrate, when the rule is evaluated, the VBG software makes the VBG request HTTP://ASERVER/VI/GETMYTEMP/48314 to the VBG source (i.e., ASERVER).

The VBG rule may include or indicate a display mode, which may be configured using a display mode selector 618. The display mode indicates how the VBG software uses the VBG datum to set or update the target VBG. The display mode may be at least one of a replacement mode (corresponding to the option "REPLACE" of the display mode selector 618), an overlay mode (corresponding to the option "OVERLAY" of the display mode selector 618), a filter mode (corresponding to the option "FILTER" of the display mode selector 618), or some other display mode.

In the replacement mode, the VBG software can use the VBG datum as the target VBG of the target conference participant. That is, the VBG datum can replace a current VBG of the conference participant with the VBG datum or a VBG part obtained therefrom. As such, in the replacement VBG mode, setting a target VBG using the VBG datum can include using the VBG datum to obtain a replacement VBG that is to replace a current VBG of a conference participant. A VBG source from which a replacement VBG is received may be referred to herein as a replacement VBG source.

In the overlay mode, setting a target VBG using the VBG datum can include using the VBG datum or VBG part obtained therefrom as an overlay VBG to modify a current VBG of the conference participant. Modifying a current VBG can include supplementing the current VBG with additional data using the VBG datum. Supplementing the current VBG can include overlaying the VBG part on the current VBG. Modifying a current VBG using the VBG datum can include using the VBG datum to obtain a VBG part that is referred to as a VBG modifier. A VBG source from which a VBG modifier is received may be referred to herein as a VBG modifier source.

In the filter mode, the VBG software can use the VBG datum to modify a foreground segment of an output image. For example, the VBG datum may be used as a filter. A filter can be an overlay on the foreground segment, rather than on the background segment of the output image.

In an example, the user may set the type of the VBG data received from the VBG source in a VBG datum type selector 620. The VBG software may use the data type to determine how to handle the data and what handler options to enable in a handler configurator 622. The UI 600 includes two data types: IMAGE and TEXT. Other data types may be possible. The IMAGE data type can mean or include that the VBG datum received from the VBG source is image data. The TEXT data type can mean or include that the VBG datum is textual, human readable data. Textual data may be simple text strings or structured textual data. Structured textual data may be JSON data, XML data, or other structured data.

In the handler configurator 622, the user provides configurations for how the VBG software is to process the VBG datum to convert it (if at all) into or to obtain therefrom a VBG part that is used to set the target VBG. The handler may be provided in a programming or scripting language that is supported by the VBG software. The user may select from a list of available handlers or provide a name of a custom handler using a handler selector 624.

To illustrate, using a simple example, an available handler (ADD_LABEL) may be one that adds a label to a textual VBG datum received from the VBG source. For example, assume that the API GETMYTEMP merely returns the temperature value 19°. The ADD_LABEL handler may be configured to prefix the label "CURRENT TEMP:" to the VBG datum. As such, evaluating the VBG rule results in the string "CURRENT TEMP: 19°" that is used to modify the current VBG of the conference participant. As another illustration, a handler may be or include regular expression processing. For example, the label may be provided as "IT IS NOW ([0-9] \*\*) AT YOUR LOCATION," where ([0-9] \*\*) is matched, during VBG rule evaluation, to a string of numbers followed by the degree symbol in the VBG datum.

The handler illustrated in FIG. 6 is one that maps a textual VBG datum to media items (e.g., images), as shown in a mapping 626. The user may provide expressions for the mappings. To illustrate, an expression 628 indicates that if the textual VBG datum is less than 19, then the VBG software is to use the image named IMAGE1.JPG for setting the target VBG of the conference participant. While not specifically shown, the UI 600 may allow the user to provide (e.g., upload) a list of images to be used for the mapping.

While certain fields, controls, and interactions are described with respect to FIG. 6, the disclosure is not so limited. In some implementations, the UI 600 may include other fields, controls, or interactions that can be used to configure additional VBG data processing features. In an example, a VBG rule may be associated with a transparency. That is, a transparency may be configured for a VBG part obtained from the VBG rule. In an example, a size may be associated with a VBG part. If a size is not provided, a default size may be associated with the VBG part. A VBG part may be scaled (e.g., resized) to match the provided size. If no size data is configured in a VBG rule, then a default size may be set for a VBG part. In an example, a position may be associated with a VBG rule (e.g., the VBG part obtained therefrom). The position may be provided as horizontal and vertical offsets with respect to, for example, a top-left pixel of a VBG. The position may be provided as a quadrant (e.g., top-left, top-right, bottom-left, bottom-right).

Figure 7A:
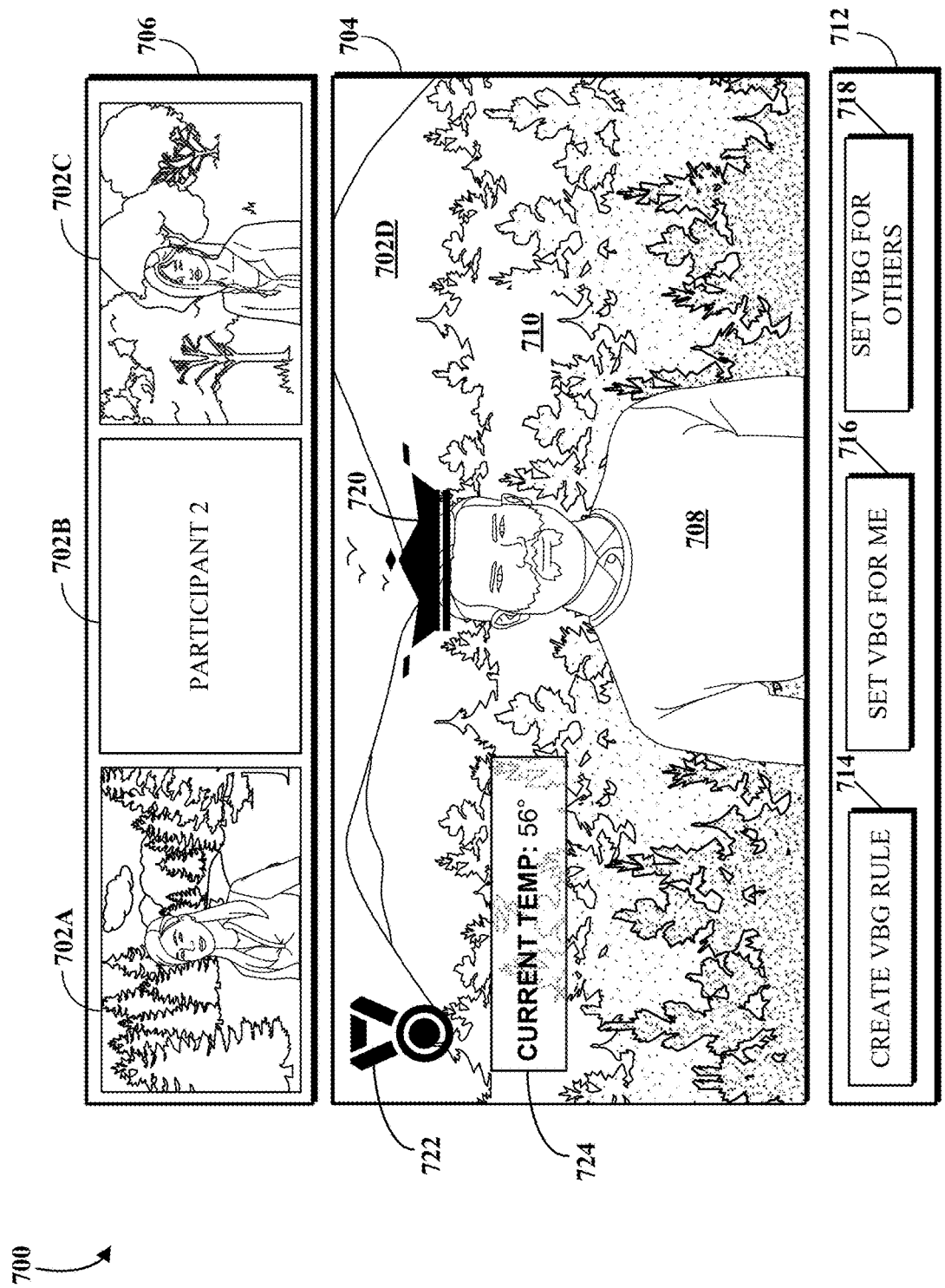
FIG. 7A illustrates an example of a user interface of using VBG data to set target VBGs of conference participants.

FIG. 7A illustrates an example of a UI 700 of using VBG data to set target VBGs of conference participants. The UI 700 can be displayed on a user device of a conference participant. The UI 700 illustrates a conference that includes four participants. Each of the conference participants can be represented by a respective tile, such as a participant 702A tile, a participant 702B tile, a participant 702C tile, and a participant 702D tile respectively. For brevity and ease of description, statements such as "the <participant X> <verb>" should be understood to mean that the "participant represented by the participant X tile <verb>;" and statements such as "the <tool X> of <participant>" should be understood to mean "the <tool X> of a VBG software that is available or executing at a user device of the <participant>."

The participant 702A, the participant 702C, and the target participant 7D, have turned on their respective cameras and, as such, respective output images of these conference participants are displayed in the corresponding tiles on respective devices of other participants. The participant 702B has not turned on their camera. As such, the corresponding tile of the participant 702B shows an identifier (e.g., PARTICIPANT 2) instead of an image of the participant 702B.

The UIs of the conferencing software may include a main stage 704 and a participant list 706. The indication (e.g., a UI control, an icon, a label, an output image, or a tile) of the participant currently speaking may be displayed in the main stage 704 and the non-speaking participants may be listed in the participant list 706. While the participant 702D is not listed in the participant list 706, in some implementations the conference participant shown in the main stage 704 may additionally be included in the participant list 706. In some implementations, a UI of the conferencing software may not include at least one of a main stage or a participant list.

The UI 700 illustrates that a VBG rule, which may be titled "NATIONAL PARK NEAR ME," is selected for the conference participants. In an example, each of the conference participants may have selected the VBG rule individually. In another example, the VBG rule may have been selected by one of the conference participants (e.g., a host) for the conference participants. In yet another example, the conference may be configured to use the VBG rule. The VBG rule may be configured to obtain an image (i.e., VBG datum type=IMAGE) that is used as the target VBG for a conference participant (i.e., display mode=REPLACE) based on a location of the conference participant (i.e., substituting a zip code for the characteristic placeholder USER_LOCATION) from a public source (i.e., VBG source type=OPEN).

The UI 700 illustrates that, since the camera of the participant 702B is not turned on, no VBG is shown for the participant 702B. However, that need not be the case. That is, a target VBG that is set based on VBG rules may be displayed for a conference participant even if their camera is not turned on. In an example, a conference participant may set a preference to show a target VBG based on VBG rules even if the conference participant does not turn on their camera. In such a case, no segmentation of camera images may be necessary to obtain output images as the tile of participant only shows the target VBG itself. That is, the output image is obtained only from one or more VBG data.

The tile corresponding to each of the conference participants whose camera is turned on includes a foreground segment (such as a foreground segment 708), which is or includes the likeness of the conference participant (e.g., the participant 702D) and a displayed background (such as a background 710), which is an image of a national park that is close to the conference participant.

A conference participant may have available commands, such as one or more of the commands 712, that can be used for, or in conjunction with, setting dynamic, participant-aware virtual backgrounds. The commands 712 is shown as including the commands 714-718. However, more or fewer commands may be available. The VBG software 416 of the user device 410, or the VBG software 408 of the server device 400, may cause the commands 712 to be presented on a device of the conference participant, such as the user device 410 of FIG. 4. The commands 712 may be presented in any number of ways and may be presented using different user control elements (e.g., buttons or menu items). A respective user flow (not illustrated) may be associated with each of the commands 712 for an optimal user experience.

In an example, the commands presented to the conference participant may depend on the configuration (e.g., permissions, privileges, or role) of the conference participant. For example, the command 718 may only be available, during a conference, to the conference host. As another example, the command 714 may only be available to a user enabled to create VBG rules.

The command 714, when invoked by a conference participant (i.e., an invoking conference participant), causes the UI 600 of FIG. 6 to be presented. The command 716, when invoked by an invoking conference participant, enables the invoking conference participant to select one or more VBG rules to be evaluated for the invoking conference participant. The command 718, when invoked by a conference participant, enables the invoking conference participant to select one or more VBG rules to be evaluated for one or more conference participants. The one or more conference participants may be or may include the invoking conference participant.

Figure 7B:
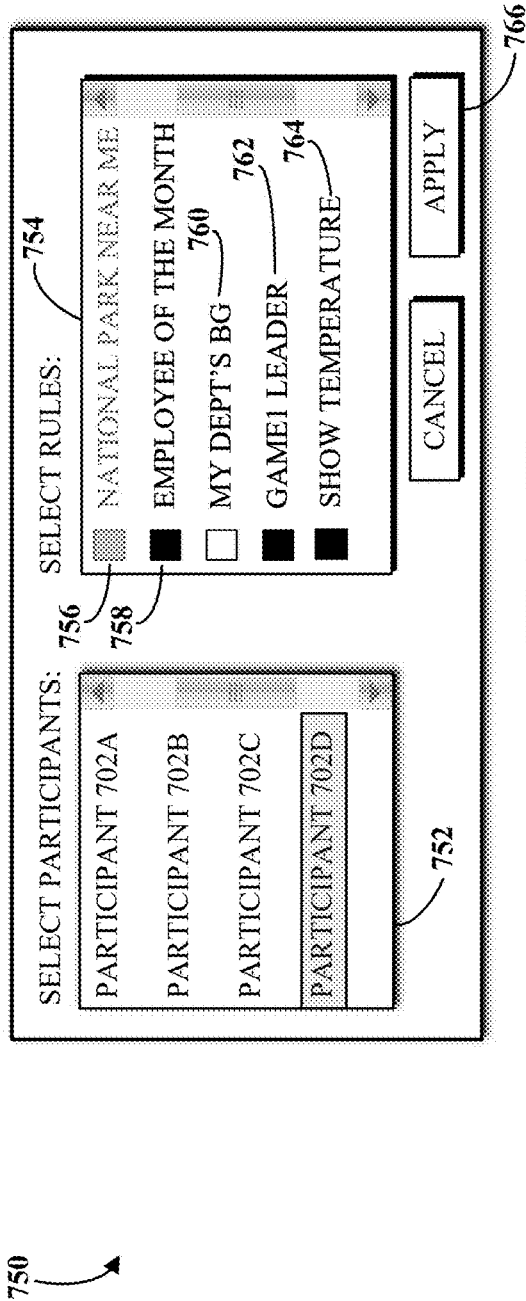
FIG. 7B illustrates an example of a user interface for selecting VBG rules.

FIG. 7B illustrates an example of a UI 750 for selecting VBG rules. The UI 750 may be displayed in response to the command 718 being invoked. The UI 750 includes a participants list 752 from which the conference participant can select a subset of the other conference participants for whom the selected VBG rules are to be evaluated. The participant list 752 can also include the invoking conference participant. The invoking conference participant can invoke the command 718 more than once to set different VBG rules for different subsets of the conference participants (or groups of the conference participants). The UI 750 can be displayed in response to the command 716 being invoked. However, in such a case, the participants list 752 may not be available (e.g., is not displayed, is hidden, or is not enabled) and the invoking conference participant is considered to be the only selected conference participant.

From an available rules list 754, the invoking conference participant can select one of more VBG rules to be evaluated for the selected conference participants. The UI 750 illustrates that the participant 702D is selected and that VBG rules 756, 758, 762 and 764 are selected but that a VBG rule 760 is not selected. As mentioned above, evaluating a VBG rule for a conference participant includes transmitting (or causing to be transmitted) by the VBG software a request to the VBG source and handling (e.g., processing) a received VBG datum according to configurations of the VBG rule to set or modify a VBG of the conference participant.

In an example, if a VBG rule is pre-set (such as by another conference participant) for the invoking conference participant, then the invoking conference participant may not be able to deselect the pre-selected VBG rule. In another example, the invoking conference participant can un-select (i.e., un-set) a pre-set VBG rule. The UI 750 illustrates that the VBG rule 756 is disabled and, as such, cannot be deselected by the invoking conference participant.

The VBG rule 758, named "EMPLOYEE OF THE MONTH," may be configured to obtain, such as from a VBG source that may be a human resources system, whether the conference participant is designated as an employee of the month. As such, the data type obtained from the VBG source may be one of the values YES or NO. The handler of the VBG rule 758 may map the value YES to an image of a crown with a display type of FILTER. As such, the image of the crown is overlayed on the foreground of the invoking conference participant, as illustrated with a filter 720 of FIG. 7A.

The VBG rule 762, named "GAME1 LEADER," may be configured to obtain, such as from a VBG source that is a game that is integrated with the conference software (i.e., a VBG source with a VBG source type of INTEGRATED), a rank (such as based on currently accumulated points) of the conference participant amongst the other conference participants. As such, the data type obtained from the VBG source may be one of the values such as 1, 2, 3, and so on. The handler of the VBG rule 762 may map the values 1, 2, and 3 to, respectively, images of a gold, silver, and bronze medal with a display type of OVERLAY. As such, the image of a medal is overlayed on the background segment for the invoking conference participant, as illustrated with a medal 722 of FIG. 7A.

The VBG rule 764, named "SHOW TEMPERATURE," can be as described above. As such, the VBG rule 764 causes a label, such as "CURRENT TEMP: 56°" to be overlayed on the background segment for the invoking conference participant, as illustrated with a label 724 of FIG. 7A. The label 724 illustrates that a transparency (e.g., transparency=30%) is configured for the VBG rule 764.

While not specifically shown in the UI 750, an evaluation order of the selected VBG rules may be specified. Any number of ways may be available for setting an evaluation order for the selected VBG rules. In an example, the evaluation order may be or depend on the order of the selected VBG rules in the available rules list 754. The invoking conference participant may be able to drag a selected VBG rules up or down the available rules list 754 to modify the evaluation order.

The VBG software (i.e., an output image generation tool therein) can use the order of evaluation to determine a placement of the outputs of VBG rules. To illustrate, as the VBG rule 758 is listed before the VBG rule 762, then the VBG software places the medal 722 of FIG. 7A above the label 724 of FIG. 7A. As mentioned above, positions may be associated with VBG parts. To illustrate, the VBG rule 758 and the VBG rule 762 may have been configured with the same position (10, 10) (i.e., 10 pixels to the right and 10 pixels below the top-left corner in the VBG). In such a case, the VBG software uses the order of evaluation to determine placements of the VBG parts so that one does not obscure the other. The invoking conference participant may select multiple VBG rules that are configured with the REPLACE display mode. In an example, the output image generation tool may evaluate only the last (in the order of evaluation) of such VBG rules since the target VBGs generated from the other VBG rules will be obscured by the last VBG rule.

Figure 7C:
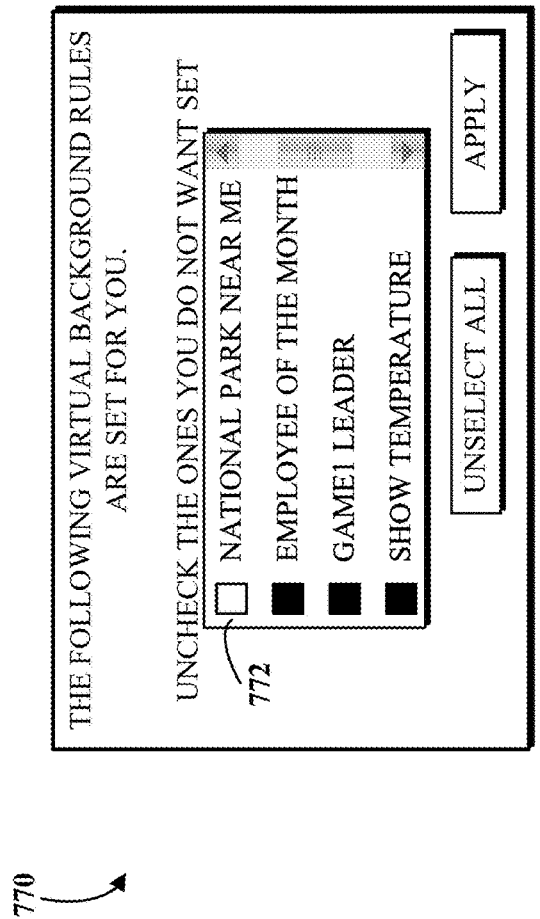
FIG. 7C illustrates an example of a user interface for showing selected VBG rules to a conference participant.

In an example, when VBG rules are set for a conference participant by another, the conference participant may be able to accept or reject at least some of the selected VBG rules. FIG. 7C illustrates an example of a UI 770 for showing selected VBG rules to a conference participant. The UI 770 may be presented to the conference participant at a time that the conference participant joins a conference or at any time that the selected VBG rules change during the conference. For example, in response to the invoking conference participant selecting an option 766 of FIG. 7B, the VBG software may cause the UI 770 to be displayed to each of the selected conference participants. A selected conference participant may accept the selected rules or may deselect some of the VBG rules. Any deselected VBG rules will not be evaluated for that conference participant. The UI 770 illustrates that the conference participant deselected a VBG rule 772.

Additional, non-limiting examples of dynamic, participant-aware virtual backgrounds using VBG rules are now described. In an example, the conferencing software 406 of FIG. 4 may implement polling capabilities whereby a host of a conference may be able to ask questions of the conference participants and the conference participants register votes (or answers), using the conferencing software 406. As such, the VBG source can be a BUILT IN data source. The votes (or answers) may be used to provide VBG data. For example, a VBG datum may identify the conference participant with the highest number of correct answers. The VBG datum may be used, for example, to overlay a gold medal over the background of the conference participant. Additionally, or alternatively, the VBG datum may be used to add a filter to the likeness of the conference participant, such as by adorning the head of the conference participant with a crown (i.e., with an image of a crown).

An example of a VBG source that is OPEN may be an image repository that receives, for example, search parameters and returns one or more matching images. The search parameters may include a characteristic of the conference participant (e.g., a zip code, a state, a city, or an IP address of the user device 410). To illustrate, a VBG rule may indicate (e.g., describe) a request to the VBG source that essentially states, "find images of national parks close to <city>," where <city> is a placeholder that the VBG software replaces with the actual city name of the conference participant at the time that the request is to be made to the VBG source. The city name may be obtained from the data store 404 based on data (e.g., profile data) associated with the conference participant. The VBG software may use one of the matching images to set the VBG for the conference participant.

In another example, a VBG source may provide weather information. As such, a VBG rule may indicate a request that essentially states, "what are the current weather conditions at <zip code>," where <zip code> is a characteristic placeholder that the VBG software replaces with the actual zip code of the conference participant at the time that the request is made to the VBG source. In response to the request, the VBG software may essentially return "it is now 19° Fahrenheit and snowing." The VBG software can use the VBG datum returned from the VBG source to set the VBG for the conference participant. A handler of the VBG rule may be configured to retrieve an image illustrating the weather condition. The image can be used as an overlay on a VBG of the conference participant. In another example, the VBG datum may be overlaid as a text string, as described with respect to the label 724 of FIG. 7A. Other processing of the VBG datum is possible.

An example of a CUSTOM VBG source configured in a VBG rule may be an application that is used in conjunction with hybrid video conferences for United Nations delegates. A hybrid conference is one where at least some of the conference participants are physically co-located, such as in a meeting hall while other conference participants attend remotely (i.e., virtually). Speakers (e.g., ambassadors) from different countries are typically assigned specific seats. The application can use the seating arrangement within the hall and the geographic locations of the remote conference participants to identify countries associated with the different conference participants. The application may receive a location within the hall or a conference participant or an IP address of a device of remote conference participant. The application may transmit a map or an indication of a map (e.g., a VBG datum that is a country name) that the VBG software can convert to a country map (i.e., a VBG part) according to a handler configured in the VBG rule. The maps obtained for the respective conference participants can be used to set the respective target VBGs for the respective conference participants.

In another example, logos of employers of the conference participants may be used as overlays. As yet another example, a VBG rule may be configured to use a CUSTOM script that obtains from a human resources system, a user directory (which may be accessible using the Lightweight Directory Access Protocol (LDAP)), or some other system the name of the department of the conference participant. Depending on the display mode and the handler details of the VBG rule, the name of the department may be overlaid on a VBG of the conference participant or may be used to obtain an image representative of the department and that can be used as a target VBG.

Figure 8A:
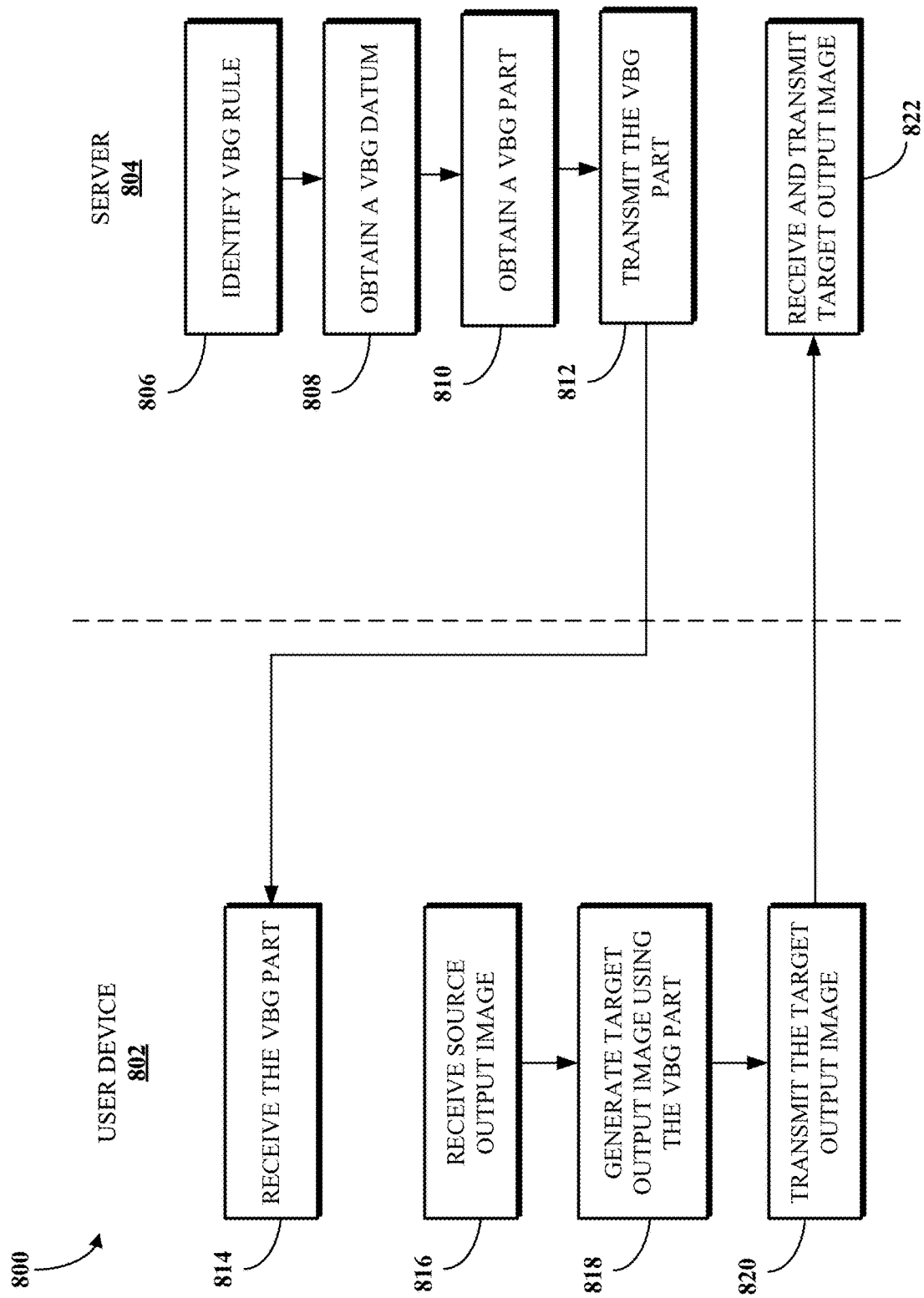
FIG. 8A is an example of an interaction diagram for dynamic, participant aware virtual backgrounds.

FIG. 8A is an example of an interaction diagram 800 for dynamic, participant aware virtual backgrounds. The interaction diagram 800 illustrates that a conference participant using a user device 802 is a current participant of a conference hosted by a server 804, which includes a conferencing software platform, such as the software platform 402 of FIG. 4. Devices of other conference participants are not shown. The user device 802 can include a camera that can be used to obtain camera images for use by the conferencing software. The interaction diagram 800 describes an implementation of participant aware virtual backgrounds where VBG data and VBG parts obtained therefrom are obtained at the server 804 and are transmitted for use at the user device 802.

At 806, a VBG rule is identified at or by the server 804. The VBG rule may be identified based on a selection of the VBG rule by a conference participant. The VBG rule may be identified based on a configuration of a conference. Identifying a VBG rule includes identifying one or more VBG rules. At 808, a VBG datum is obtained, such as by a VBG software of the server 804, for the identified VBG rule. That is, the VBG software obtains characteristics (i.e., characteristic values) for characteristic placeholders (if any) identified in the VBG rule and may transmit a request for the VBG datum to the VBG source identified in the VBG rule. At 810, a VBG part is obtained from the VBG part. As described above, the VBG part may be the VBG datum itself. The VBG part is obtained according to the handler configuration of the VBG rule.

At 812, the VBG part is transmitted to the user device 802. More specifically, the VBG part is transmitted to a VBG software of the user device 802. Transmitting the VBG part to the user device 802 may include transmitting an indication of the VBG rule, transmitting the display mode indicated by the VBG rule, or both to the user device 802. As such, the VBG software at the user device 802 can use the display mode to determine how to apply the VBG part to source output images to obtain target output images. In a case that multiple VBG rules are identified, the evaluation order of the VBG rules may also be transmitted to the user device 802. At 814, the VBG part is received at the user device 802.

At 816, a source output image is received. The source output image may be a camera image. As such, the source output image may include a background captured in the field of view of the camera of the user device 802. The source output image may include a virtual background. In an example, the camera may include capabilities for substituting the background segment of a camera image with another image. If a user is sitting in front of the camera, the foreground segment may include the portion of the user within a field of view of the camera (e.g., their head and torso) and potentially one or more objects (e.g., a desk, a keyboard, and/or a mouse) that may be within the field of view of the camera; and the background segment may include everything else in the camera image. In another example, the VBG software 500 may receive, such as from another component of a conferencing software of the user device 802, an image that includes another VBG selected by the conference participant.

At 818, a target output image is generated using the VBG part, as described above. In the case of multiple VBG parts, the VBG parts may be applied to the source output image based on the evaluation order received from the server 804. At 820, the target output image is transmitted to the server 804. At 822, the server 804 receives the target output image and transmits the target output image to at least the devices of other conference participants (not shown).

Figure 8B:
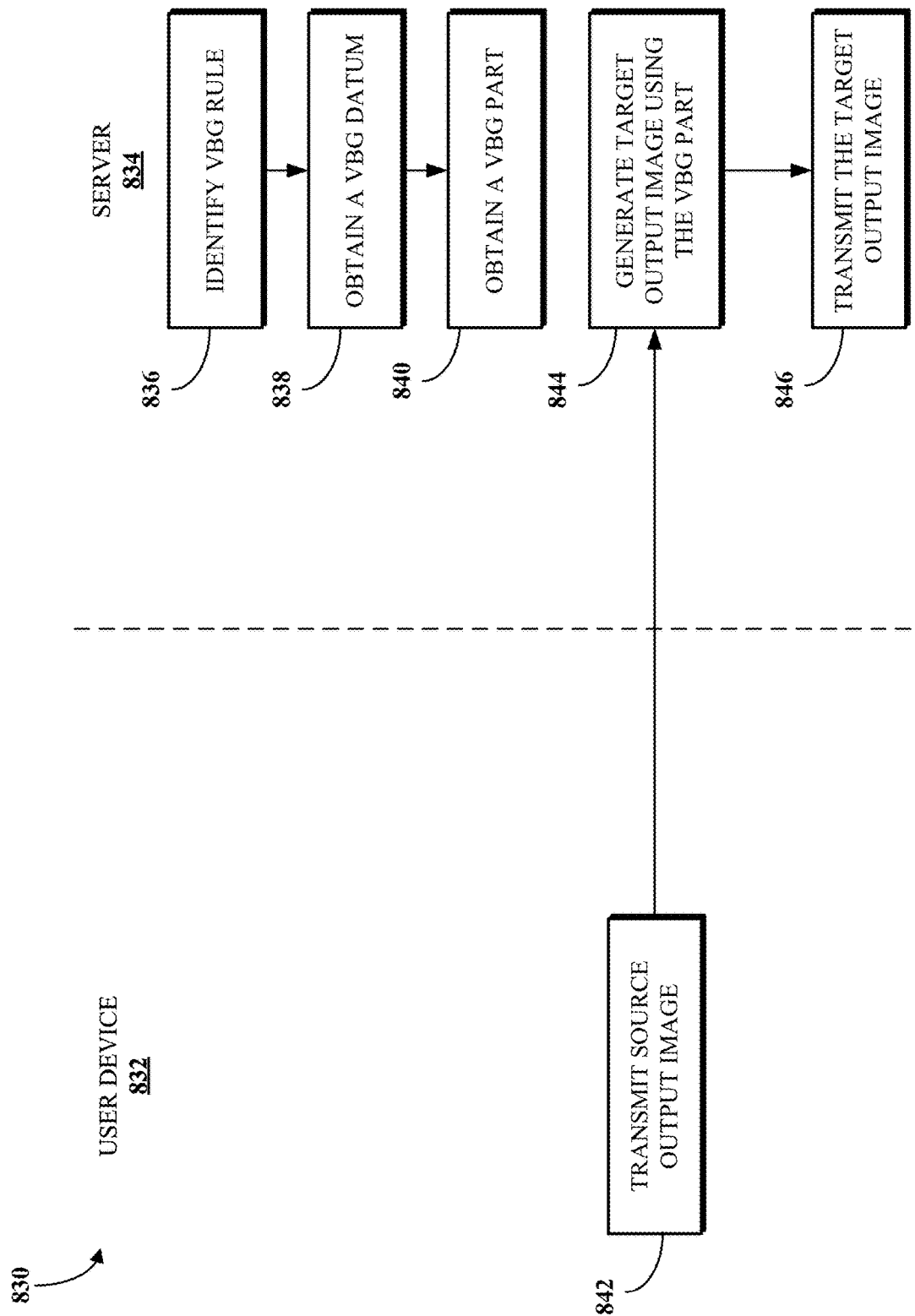
FIG. 8B is an example of another interaction diagram for dynamic, participant aware virtual backgrounds.

FIG. 8B is an example of another interaction diagram 830 for dynamic, participant aware virtual backgrounds. The interaction diagram 830 illustrates that a conference participant using a user device 832 is a current participant of a conference hosted by a server 834, which includes a conferencing software platform, such as the software platform 402 of FIG. 4. Devices of other conference participants are not shown. The user device 832 can include a camera that can be used to obtain camera images for use by the conferencing software. The interaction diagram 830 describes an implementation of participant aware virtual backgrounds where VBG data and VBG parts are obtained and used at the server 804 for generating target output images.

The interaction diagram 830 includes interactions 836, 838, 840, which can be as described with respect to interactions 806, 808, 810 of FIG. 8A. At 842, a source output image is transmitted from the user device 832 to the server 834. At 844, a target output image is generated using the VBG part. The target output image can be generated as described with respect to 818 of FIG. 8A. At 846, the target output image is transmitted to at least some of the other conference participants of the conference.

Figure 8C:
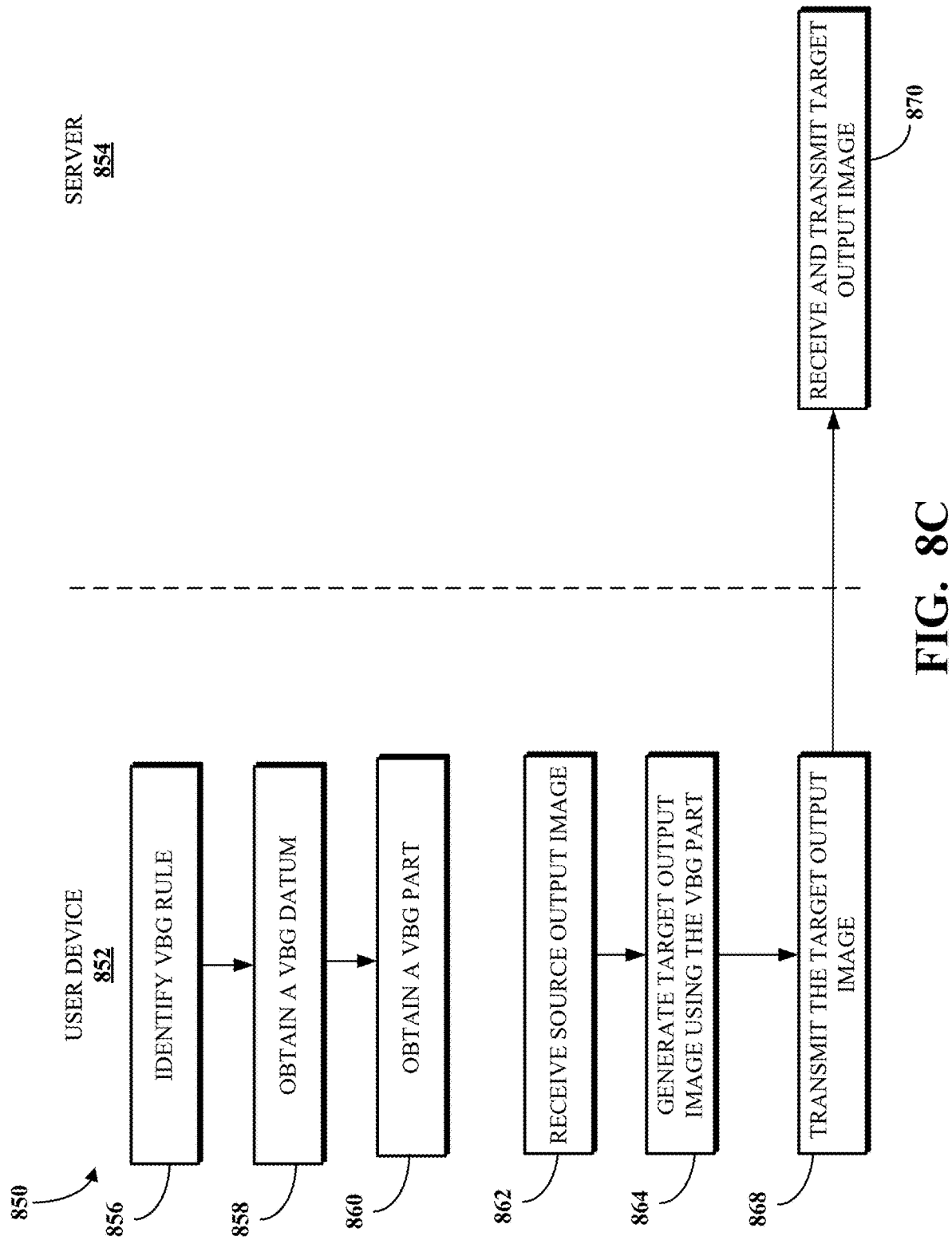
FIG. 8C is an example of another interaction diagram for dynamic, participant aware virtual backgrounds.

FIG. 8C is an example of another interaction diagram 850 for dynamic, participant aware virtual backgrounds. Whereas in the interaction diagram 800 of FIG. 8A, VBG data and VBG parts are obtained at a server 854 and used at a user device 852, in the interaction diagram 850, VBG data and VBG parts are obtained and used at a user device 856. Whereas in the interaction diagram 830 of FIG. 8B, VBG data and VBG parts are obtained and used at a server, in the interaction diagram 850, VBG data and VBG parts are obtained and used at a user device 856. The interaction diagram 850 includes interactions 856, 858, 860, which can be similar to the interactions 806, 808, 810 of FIG. 8A, respectively. Interactions 862, 868, 870 can be similar to the interactions 816, 818, 820, 822 of FIG. 8A, respectively.

Figure 9:
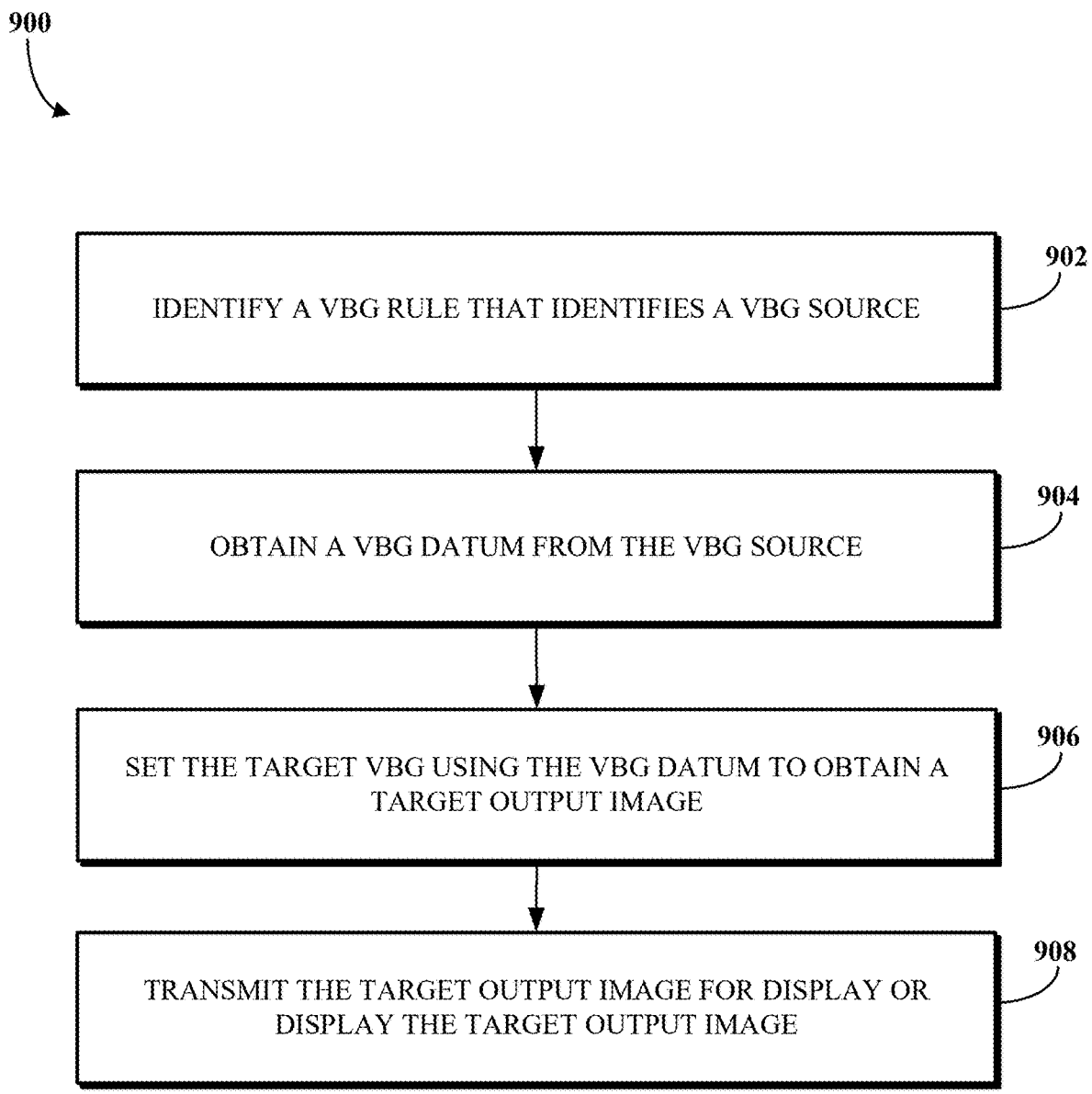
FIG. 9 is a flowchart of an example of a technique for setting a background for a conference participant.

To further describe some implementations in greater detail, reference is next made to examples of techniques which may be performed for or using dynamic, participant aware virtual backgrounds. FIG. 9 is a flowchart of an example of a technique 900 for setting a background for a conference participant. The technique 900 can be executed using computing devices, such as the systems, hardware, and software described with respect to FIGS. 1-8C.

The technique 900 can be performed, for example, by executing a machine-readable program or other computer-executable instructions, such as routines, instructions, programs, or other code. The steps, or operations, of the technique 900 or another technique, method, process, or algorithm described in connection with the implementations disclosed herein can be implemented directly in hardware, firmware, software executed by hardware, circuitry, or a combination thereof. The technique 900 can be implemented in whole or in part by a VBG software, such as the VBG software 500 of FIG. 5. The VBG software may be available or executing at a target user device or a server device.

For simplicity of explanation, the technique 900 is depicted and described herein as a series of steps or operations. However, the steps or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

At 902, a VBG rule is identified. The VBG rule can be identified as described above. The VBG rule can be used for setting respective VBGs of at least some (e.g., two) conference participants of a video conference. The at least two conference participants can include a first conference participant and a second conference participant. As such, the VBG rule can be used to set a first target VBG of the first conference participant. The VBG rule can identify a VBG source.

The first target VBG set for the first conference participant using the VBG rule would be different from a second target VBG set for the second conference participant using the VBG rule. That is, if both of the first and the second conference participants were to select (or have selected or set for them) the VBG rule, then the respective target VBGs set for the first and the second conference participants would be different. Said another way, the first target VBG of the first conference participant may be different from the second target VBG of the second conference participant. Thus, the first target VBG and the second target VBG may be independently (and separately) obtained from the VBG source.

In an example, and as described with respect to the conference participant AI tool 512 of FIG. 5, the VBG rule is identified based on respective characteristics of at least some of the conference participants. In an example, a characteristic value is obtained for a characteristic placeholder identified in the VBG rule; and the characteristic value is transmitted to the VBG source in a request for the VBG datum.

At 904, a VBG datum is obtained from the VBG source. In an example, and as described above, the VBG datum can be obtained in response to a request (i.e., a VBG request) transmitted from the VBG software to the VBG source. In another example, the VBG datum can be received by a callback handler that is identified in the VBG rule. The callback handler receives the VBG datum from the VBG source.

At 906, the first target VBG can be set using the VBG datum to obtain a target output image. In an example, the VBG datum (or a VBG part obtained therefrom) can be overlaid on a background segment of the image that includes the conference participant (i.e., includes a likeness of the conference participant). In an example, the first target VBG can be combined with an image that may include the first conference participant to obtain the target output image. In an example, the VBG can be combined with a foreground segment of the image. In another example, the VBG can be combined with a background segment of the image.

In an example, a display mode identified in the VBG rule can be used to set the first target VBG using the VBG datum. In an example, setting the first target VBG using the VBG datum can include obtaining a VBG part from the VBG datum based on a handler configuration identified in the VBG rule and setting the first target VBG using the VBG part. At 908, the target output image is transmitted for display or is displayed at a user device.

In an example, the technique 900 can include transmitting a characteristic of the first conference participant to the VBG source. The VBG datum can be based on the characteristic. That is, the VBG source may obtain the VBG datum based on the characteristic. In an example, the target output image can be displayed in a tile corresponding to the first participant where respective tiles are output for at least some (e.g., all) of the conference participants.

The VBG rule can indicate or include a refresh parameter. In an example, the technique 900 can include transmitting, at a frequency corresponding to the refresh parameter, requests for a plurality of new VBG data; and resetting the first target VBG responsive to receiving at least some of the plurality of the new VBG data. In an example, the technique 900 can include receiving, at a frequency corresponding to the frequency parameter, a plurality of new VBG data; and resetting the first target VBG responsive to receiving at least some of the plurality of the new VBG data.

In an example, the technique 900 can include using an evaluation order to determine an order of processing of the VBG datum and another VBG datum obtained using another VBG rule to set the target VBG using the VBG datum and the other VBG datum. In an example, the technique 900 can include obtaining another VBG datum based on another VBG rule and modifying a foreground segment of another source image using on the other VBG datum.

Figure 10:
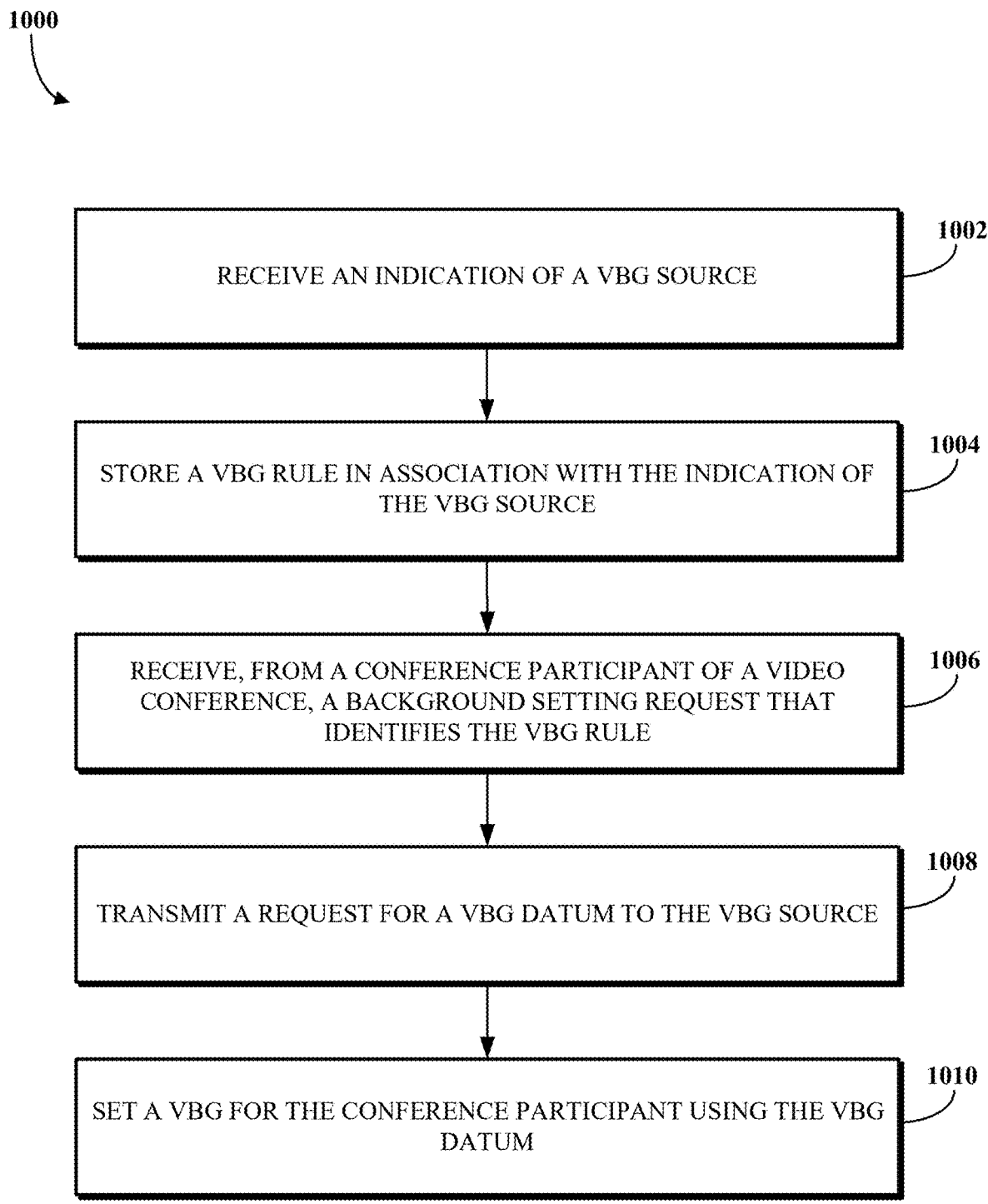
FIG. 10 is a flowchart of an example of another technique for setting a background for a conference participant.

FIG. 10 is a flowchart of an example of a technique 1000 for setting a background for a conference participant. The technique 1000 can be executed using computing devices, such as the systems, hardware, and software described with respect to FIGS. 1-8C.

The technique 1000 can be performed, for example, by executing a machine-readable program or other computer-executable instructions, such as routines, instructions, programs, or other code. The steps, or operations, of the technique 1000 or another technique, method, process, or algorithm described in connection with the implementations disclosed herein can be implemented directly in hardware, firmware, software executed by hardware, circuitry, or a combination thereof. The technique 1000 can be implemented in whole or in part by a VBG software, such as the VBG software 500 of FIG. 5. The VBG software may be available or executing at a target user device or a server device.

For simplicity of explanation, the technique 1000 is depicted and described herein as a series of steps or operations. However, the steps or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

At 1002, an indication of a VBG source is received. The indication of the VBG source can be received as described with respect to FIG. 6. At 1004, a VBG rule can be stored in association with the indication of the VBG source. The VBG rule may be stored in a database such as the data store 404 of FIG. 4. Storing the VBG rule in association with the indication of the VBG source can include storing a configuration or a description of the VBG source in or related to the VBG rule. At 1006, a background setting request that identifies the VBG rule is received from a conference participant of a video conference. In an example, the request that identifies the VBG rule can be received as described with at least one of the commands 716-718 of FIG. 7A.

At 1008, a request for a VBG datum is transmitted to the VBG source. The request can be transmitted according to the configuration of the VBG source. In an example, the request can be an initial request that registers an interest in receiving the VBG datum from the VBG source. The initial request can include a callback handler for receiving the VBG datum. The VBG source transmits the VBG datum to the callback handler. At 1010, a VBG is set for the conference participant using the VBG datum.

In an example, the technique 1000 can include receiving a characteristic placeholder and storing the VBG rule in association with the characteristic placeholder. In an example, a handler configuration can be stored in association with the VBG rule. The handler configuration identifies or defines how the VBG software is to obtain a VBG part from the VBG datum. The VBG is then set using the VBG part. In an example, a display mode is stored in association with the VBG rule. The display mode can indicate at least one of whether an obtained VBG datum is a to be used as a replacement of a current VBG or whether the obtained VBG datum is to be used as an overlay onto the current VBG.

In an example, a background-update frequency is stored in associated with the VBG rule. Respective requests for VBG data are transmitted to the VBG source according to the background-update frequency. In an example, a plurality of media data (e.g., images) are received. For example, a user may cause the media data to be stored in a database associated with VBG software. A mapping from a plurality of values corresponding to the VBG datum to at least some of the plurality of media data may be received, such as described with respect to FIG. 6. The mapping can be stored in association with the VBG rule.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

One aspect includes identifying a virtual-background (VBG) rule for setting a first target VBG of a first conference participant of at least two conference participants of a video conference, where the at least two conference participants include the first conference participant and a second conference participant, where the VBG rule identifies a VBG source, and where the first target VBG for the first conference participant set using the VBG rule is different from a second target VBG for the second conference participant set using the VBG rule. A VBG datum may be obtained from the VBG source. The first target VBG may be set using the VBG datum to obtain a target output image. The target output image may be transmitted for display or may be displayed. Other embodiments of this aspect include corresponding computer systems, apparatus, and computer programs recorded on one or more computer storage devices, each configured to perform the actions of the methods.

Implementations may include one or more of the following features. A characteristic of the first conference participant may be transmitted to the VBG source, where the VBG datum is based on the characteristic. Setting the first target VBG using the VBG datum may include overlaying the VBG datum on a background segment of an image that includes the first conference participant. Setting the first target VBG using the VBG datum may include setting a background segment of an image using the VBG datum.

The VBG rule may be identified based on respective characteristics of the at least two conference participants. The VBG datum may be obtained from the VBG source in response to a request transmitted to the VBG source. The VBG rule may further indicate a refresh parameter. Requests for a plurality of new VBG data may be transmitted at a frequency corresponding to the refresh parameter. The first target VBG may be reset responsive to receiving at least some of the plurality of the new VBG data. The VBG rule may indicate a frequency parameter.

A characteristic value may be obtained for a characteristic placeholder identified in the VBG rule. The characteristic value may be transmitted to the VBG source. Setting the first target VBG using the VBG datum may include using a display mode identified in the VBG rule to set the first target VBG using the VBG datum. Setting the first target VBG using the VBG datum may include obtaining a VBG part from the VBG datum based on a handler configuration identified in the VBG rule; and setting the first target VBG using the VBG part.

The VBG datum may be received from the VBG source in response to a request transmitted to the VBG source. The VBG rule may be a first VBG rule and the VBG datum may be a first VBG datum. Setting the first target VBG may include using an evaluation order to determine an order of processing of the first VBG datum and a second VBG datum obtained using a second VBG rule to set the first target VBG using the first VBG datum and the second VBG datum. Another VBG datum may be obtained based on another VBG rule. A foreground segment of another source image may be set using on the other VBG datum. The VBG datum may be obtained by a callback handler that receives the VBG datum from the VBG source. The VBG datum may be received from the VBG source in response to a request transmitted to the VBG source.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a method.

The method includes receiving an indication of a virtual background (VBG) source. A VBG rule is stored in association with the indication of the VBG source. A background setting request that identifies the VBG rule may be received from a conference participant. A request for a VBG datum may be transmitted to the VBG source. A VBG may be set for the conference participant using the VBG datum. Implementations may include one or more of the following features.

A characteristic placeholder may be received. The VBG may be stored rule in association with the characteristic placeholder. The request may indicate the characteristic of the conference participant. The characteristic placeholder may identify a geographic location of the conference participant. A handler configuration may be stored in association with VBG rule. The handler configuration may identify how to obtain a VBG part from the VBG datum. The VBG may be set using the VBG part. Setting the VBG for the conference participant using the VBG datum may include: determining, based on an overlay setting stored in association with the VBG rule, whether to use the VBG datum as an overlay VBG or whether to use the VBG datum as a replacement VBG.

The request transmitted to the VBG source may include a callback handler that receives the VBG datum from the VBG source. Respective requests for VBG data are transmitted to the VBG source according to the background-update frequency. A plurality of media data may be received. A mapping from a plurality of values of the VBG datum to the plurality of media data may be received. The mapping may be stored in association with the VBG rule.

A display mode may be stored in association with the VBG rule. The display mode may indicate at least one of whether an obtained VBG datum is a replacement of a current VBG or whether the obtained VBG datum is an overlay onto the current VBG. A background-update frequency may be associated with the VBG rule. Respective requests for VBG data may be transmitted to the VBG source according to the background-update frequency.

The implementations of this disclosure can be described in terms of functional block components and various processing operations. Such functional block components can be realized by a number of hardware or software components that perform the specified functions. For example, the disclosed implementations can employ various integrated circuit components (e.g., memory elements, processing elements, logic elements, look-up tables, and the like), which can carry out a variety of functions under the control of one or more microprocessors or other control devices. Similarly, where the elements of the disclosed implementations are implemented using software programming or software elements, the systems and techniques can be implemented with a programming or scripting language, such as C, C++, Java, JavaScript, assembler, or the like, with the various algorithms being implemented with a combination of data structures, objects, processes, routines, or other programming elements.

Functional aspects can be implemented in algorithms that execute on one or more processors. Furthermore, the implementations of the systems and techniques disclosed herein could employ a number of conventional techniques for electronics configuration, signal processing or control, data processing, and the like. The words "mechanism" and "component" are used broadly and are not limited to mechanical or physical implementations, but can include software routines in conjunction with processors, etc. Likewise, the terms "system" or "tool" as used herein and in the figures, but in any event based on their context, may be understood as corresponding to a functional unit implemented using software, hardware (e.g., an integrated circuit, such as an ASIC), or a combination of software and hardware. In certain contexts, such systems or mechanisms may be understood to be a processor-implemented software system or processor-implemented software mechanism that is part of or callable by an executable program, which may itself be wholly or partly composed of such linked systems or mechanisms.

Implementations or portions of implementations of the above disclosure can take the form of a computer program product accessible from, for example, a computer-usable or computer-readable medium. A computer-usable or computer-readable medium can be a device that can, for example, tangibly contain, store, communicate, or transport a program or data structure for use by or in connection with a processor. The medium can be, for example, an electronic, magnetic, optical, electromagnetic, or semiconductor device.

Other suitable mediums are also available. Such computer-usable or computer-readable media can be referred to as non-transitory memory or media, and can include volatile memory or non-volatile memory that can change over time. The quality of memory or media being non-transitory refers to such memory or media storing data for some period of time or otherwise based on device power or a device power cycle. A memory of an apparatus described herein, unless otherwise specified, does not have to be physically contained by the apparatus, but is one that can be accessed remotely by the apparatus, and does not have to be contiguous with other memory that might be physically contained by the apparatus.

While the disclosure has been described in connection with certain implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method, comprising:
   receiving an indication of a virtual background (VBG) source;
   storing a VBG rule in association with the indication of the VBG source;

receiving, from a conference participant of a video conference, a background setting request that identifies the VBG rule;

transmitting a request for a VBG datum to the VBG source, wherein the request transmitted to the VBG source includes a callback handler that receives the VBG datum from the VBG source; and setting a VBG for the conference participant using the VBG datum.

2. The method of claim 1, further comprising:
receiving a characteristic placeholder; and
storing the VBG rule in association with the characteristic placeholder.

3. The method of claim 1, further comprising:
obtaining a characteristic value matching a characteristic placeholder of the VBG rule, wherein the request indicates the characteristic value.

4. The method of claim 1, further comprising:
storing a handler configuration in association with the VBG rule, wherein the handler configuration identifies how to obtain a VBG part from the VBG datum, wherein the VBG is set using the VBG part.

5. The method of claim 1, wherein setting the VBG for the conference participant using the VBG datum comprises:
determining, based on an overlay setting stored in association with the VBG rule, whether to use the VBG datum as an overlay VBG or whether to use the VBG datum as a replacement VBG.

6. The method of claim 1, further comprising:
storing, with respect to the callback handler, a handler configuration in association with the VBG rule, wherein the handler configuration identifies obtaining a VBG part from the VBG datum.

7. The method of claim 1, further comprising:
associating, with the VBG rule, a characteristic placeholder that resolves to a geographic location.

8. The method of claim 1, further comprising:
receiving a background-update frequency; and
associating the background-update frequency with the VBG rule,
wherein respective requests for VBG data are transmitted to the VBG source according to the background-update frequency.

9. The method of claim 1, further comprising:
receiving a plurality of media data;
receiving a mapping from a plurality of values of the VBG datum to the plurality of media data; and
storing the mapping in association with the VBG rule.

10. A device, comprising:
a memory; and
a processor, the processor configured to execute instructions stored in the memory to:
receive an indication of a virtual background (VBG) source;
store a VBG rule in association with the indication of the VBG source;
receive, from a conference participant of a video conference, a background setting request that identifies the VBG rule;
transmit a request for a VBG datum to the VBG source, wherein the request transmitted to the VBG source includes a callback handler that receives the VBG datum from the VBG source; and
set a VBG for the conference participant using the VBG datum.

11. The device of claim 10, wherein the processor is further configured to execute instructions stored in the memory to:
receive a characteristic placeholder; and
store the VBG rule in association with the characteristic placeholder.

12. The device of claim 10, wherein the processor is further configured to execute instructions stored in the memory to:
store, with respect to the callback handler, a handler configuration in association with the VBG rule, wherein the handler configuration identifies obtaining a VBG part from the VBG datum, and wherein the VBG is set using the VBG part.

13. The device of claim 10, wherein the processor is further configured to execute instructions stored in the memory to:
store a display mode in association with the VBG rule, wherein the display mode indicates at least one of whether an obtained VBG datum is a replacement of a current VBG or whether the obtained VBG datum is an overlay onto the current VBG.

14. The device of claim 10, wherein the processor is further configured to execute instructions stored in the memory to:
associate a background-update frequency with the VBG rule, wherein respective requests for VBG data are transmitted to the VBG source according to the background-update frequency.

15. The device of claim 10, wherein the processor is further configured to execute instructions stored in the memory to:
receive a plurality of media data;
receive a mapping from a plurality of values corresponding to the VBG datum to at least some of the plurality of media data; and
store the mapping in association with the VBG rule.

16. A non-transitory computer readable medium storing instructions operable to cause one or more processors to perform operations comprising:
receiving an indication of a virtual background (VBG) source;
storing a VBG rule in association with the indication of the VBG source;
receiving, from a conference participant of a video conference, a background setting request that identifies the VBG rule;
transmitting a request for a VBG datum to the VBG source, wherein the request transmitted to the VBG source includes a callback handler that receives the VBG datum from the VBG source; and
setting a VBG for the conference participant using the VBG datum.

17. The non-transitory computer readable medium of claim 16, wherein the operations further comprise:
receiving a characteristic placeholder; and
storing the VBG rule in association with the characteristic placeholder.

18. The non-transitory computer readable medium of claim 16, wherein the operations further comprise:
storing, with respect to the callback handler, a handler configuration in association with the VBG rule, wherein the handler configuration identifies obtaining a VBG part from the VBG datum, and wherein the VBG is set using the VBG part.

19. The non-transitory computer readable medium of claim 16, wherein the operations further comprise:

storing a display mode in association with the VBG rule, wherein the display mode indicates at least one of whether an obtained VBG datum is a replacement of a current VBG or whether the obtained VBG datum is an overlay onto the current VBG.

20. The non-transitory computer readable medium of claim 16, wherein the operations further comprise:

associating a background-update frequency with the VBG rule, wherein respective requests for VBG data are transmitted to the VBG source according to the background-update frequency.

* * * * *